(12) United States Patent
Yeo et al.

(10) Patent No.: US 11,647,501 B2
(45) Date of Patent: May 9, 2023

(54) METHOD AND APPARATUS FOR FREQUENCY AND TIME RESOURCE ALLOCATION FOR DATA TRANSMISSION IN WIRELESS COMMUNICATION SYSTEM

(71) Applicant: Samsung Electronics Co., Ltd., Suwon-si (KR)

(72) Inventors: Jeongho Yeo, Suwon-si (KR); Cheolkyu Shin, Suwon-si (KR); Hyunseok Ryu, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 16/951,392

(22) Filed: Nov. 18, 2020

(65) Prior Publication Data

US 2021/0153231 A1    May 20, 2021

(30) Foreign Application Priority Data

Nov. 20, 2019   (KR) .................. 10-2019-0149811
Feb. 25, 2020   (KR) .................. 10-2020-0023266
Feb. 27, 2020   (KR) .................. 10-2020-0024128

(51) Int. Cl.
  *H04W 4/40*      (2018.01)
  *H04W 72/20*     (2023.01)
  *H04W 72/0446*   (2023.01)

(52) U.S. Cl.
  CPC ....... *H04W 72/20* (2023.01); *H04W 72/0446* (2013.01); *H04W 4/40* (2018.02)

(58) Field of Classification Search
  CPC ..... H04W 4/40; H04W 4/70; H04W 72/0406; H04W 72/0446; H04W 72/1278
  See application file for complete search history.

(56) References Cited

U.S. PATENT DOCUMENTS

2020/0288435 A1*  9/2020  Kwak ............... H04W 4/40
2022/0077991 A1*  3/2022  Hwang ............. H04W 72/02

OTHER PUBLICATIONS

Intel Corporation, UE-Autonomous Resource Allocation for NR V2X Sidelink Communication, R1-1908635, 3GPP TSG RAN WG1 #98, Prague, Czech Republic, Aug. 17, 2019, pp. 1-28.
LG Electronics, Discussion on physical layer structure for NR sidelink, R1-1911346, 3GPP TSG RAN WG1 #98bis, Chongqing, China, Oct. 22, 2019, pp. 1-41.

(Continued)

*Primary Examiner* — Khaled M Kassim
*Assistant Examiner* — Zhaohui Yang
(74) *Attorney, Agent, or Firm* — Jefferson IP Law, LLP

(57) ABSTRACT

A communication technique and a system for fusing a 5th generation (5G) communication system with Internet of things (IoT) technology to support a higher data rate after a 4th generation (4G) system are provided. The communication technique includes intelligent services (e.g., a smart home, a smart building, a smart city, a smart car or a connected car, healthcare, digital education, retail, security-and safety-related services, or the like), based on 5G communication technology and IoT-related technology. The disclosure provides a method and apparatus for assigning frequency and time resources for data transmission in a wireless communication system.

16 Claims, 19 Drawing Sheets

(56) References Cited

OTHER PUBLICATIONS

Samsung, On Resource Allocation for NR V2X Mode 2, R1-1908477, 3GPP TSG RAN WG1 #98, Prague, Czech Republic, Aug. 17, 2019, pp. 1-7.
Huawei et al.. Sidelink physical layer procedures for NR V2X, R1-1911887, 3GPP TSG RAN WG1 #99, Reno, USA, Nov. 9, 2019, pp. 1-30.
Panasonic., Discussion on physical layer structure for sidelink in NR V2X, R1-1912752, 3GPP TSG RAN WG1 #99, Reno, USA, Nov. 8, 2019, pp. 1-11.
International Search Report dated Mar. 5, 2021, issued in International Application No. PCT/KR2020/016428.

* cited by examiner

In case of allocating one resource

METHOD AND APPARATUS FOR FREQUENCY AND TIME RESOURCE ALLOCATION FOR DATA TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0149811, filed on Nov. 20, 2019, in the Korean Intellectual Property Office, of a Korean patent application number 10-2020-0023266, filed on Feb. 25, 2020, in the Korean Intellectual Property Office, and of a Korean patent application number 10-2020-0024128, filed on Feb. 27, 2020, in the Korean Intellectual Property Office, the disclosure of each of which is incorporated by reference herein in its entirety.

BACKGROUND

1. Field

The disclosure relates to a wireless mobile communication system. More particularly, the disclosure relates to a method and apparatus for finding frequency-time resources to be transmitted and transmitting a frequency-time resource through which data is transmitted to a receiving terminal, that is, resource allocation, in a process in which a vehicle terminal supporting vehicle communication (i.e., vehicle-to-everything (V2X) transmits and receives data information in communication between terminals, such as sidelinks with other vehicle terminals and pedestrian portable terminals.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" or a "Post long-term evolution (LTE) System". The 5G communication system defined by 3rd generation partnership project (3GPP) is called a "New Radio (NR) system".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed in 5G communication systems and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation. (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "detection technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

According to the recent development of the communication system, the development of the vehicle-to-everything (V2X) system has been made in various ways.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to a wireless communication system, and relates to a method and an apparatus for selecting a transmission resource in a process in which a vehicle terminal supporting vehicle-to-everything (V2X) exchanges information using a sidelink with another vehicle terminal and a pedestrian portable terminal.

Another aspect of the disclosure is to provide a method and apparatus for determining a time position of a physical sidelink shared channel (PSSCH) resource for transmission and reception of sidelink data.

Additional aspects will be set forth in part in the description which follows and, in part, will be apparent from the description, or may be learned by practice of the presented embodiments.

In accordance with an aspect of the disclosure, a method performed by a first terminal in a wireless communication system is provided. The method includes receiving, from a base station, resource pool information for a sidelink communication, the resource pool information configuring a maximum number of physical sidelink shared channel (PSSCH) resources for the sidelink communication, transmitting, to a second terminal, sidelink control information (SCI) scheduling a PSSCH based on the resource pool information, the SCI including time resource assignment information associated with a slot offset for the PSSCH, and transmitting, to the second terminal, a sidelink data on the PSSCH based on the SCI, wherein a size of a bit field for the time resource assignment information is identified based on the maximum number of the PSSCH resources configured by the resource pool information.

In addition, in the method, the resource pool information is included in system information, and the maximum number is configured to one of 2 or 3.

In the method, in a case that the maximum number is configured to 2, the size of the bit field is identified as 5 bits, and in a case that the maximum number is configured to 3, the size of the bit field is identified as 9 bits.

In the method, the slot offset is a time offset in units of slots with respect to a first time resource scheduled by the SCI, and a value of a field including the time resource assignment information is a time resource indicator value (TRIV).

In the method, the TRIV is identified based on a number of resources for the PSSCH, and in a case that the number of the resources for the PSSCH is 1, the TRIV is zero, in a case that the number of the resources for the PSSCH is 2, the TRIV is from 1 to 31, and in a case that the number of the resources for the PSSCH is 3, two slot offset values are obtained from the TRIV.

In accordance with another of the disclosure, a method performed by a second terminal in a wireless communication system is provided. The method includes receiving, from a first terminal, SCI scheduling a physical sidelink shared channel (PSSCH) based on resource pool information for a sidelink communication, the SCI including time resource assignment information associated with a slot offset for the PSSCH, and receiving, from the second terminal, a sidelink data on the PSSCH based on the SCI, wherein the resource pool information, which is received by the first terminal from a base station, configures a maximum number of PSSCH resources for the sidelink communication, and wherein a size of a bit field for the time resource assignment information is identified based on the maximum number of the PSSCH resources configured by the resource pool information.

In accordance with another of the disclosure, a first terminal in a wireless communication system is provided. The first terminal includes a transceiver configured to transmit and receive a signal, and at least one processor coupled with the transceiver and configured to: receive, from a base station, resource pool information for a sidelink communication, the resource pool information configuring a maximum number of physical sidelink shared channel (PSSCH) resources for the sidelink communication, transmit, to a second terminal, SCI scheduling a PSSCH based on the resource pool information, the SCI including time resource assignment information associated with a slot offset for the PSSCH, and transmit, to the second terminal, a sidelink data on the PSSCH based on the SCI, wherein a size of a bit field for the time resource assignment information is identified based on the maximum number of the PSSCH resources configured by the resource pool information.

In accordance with another of the disclosure, a second terminal in a wireless communication system is provided. The second terminal includes a transceiver configured to transmit and receive a signal, and at least one processor coupled with the transceiver and configured to: receive, from a first terminal, SCI scheduling a physical sidelink shared channel (PSSCH) based on resource pool information for a sidelink communication, the SCI including time resource assignment information associated with a slot offset for the PSSCH, and receive, from the second terminal, a sidelink data on the PSSCH based on the SCI, wherein the resource pool information, which is received by the first terminal from a base station, configures a maximum number of PSSCH resources for the sidelink communication, and wherein a size of a bit field for the time resource assignment information is identified based on the maximum number of the PSSCH resources configured by the resource pool information.

The disclosure proposes a method of detection and resource allocation by minimizing power consumption of a terminal in sidelink communication, and thus can be effectively used to optimize power consumption of a terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
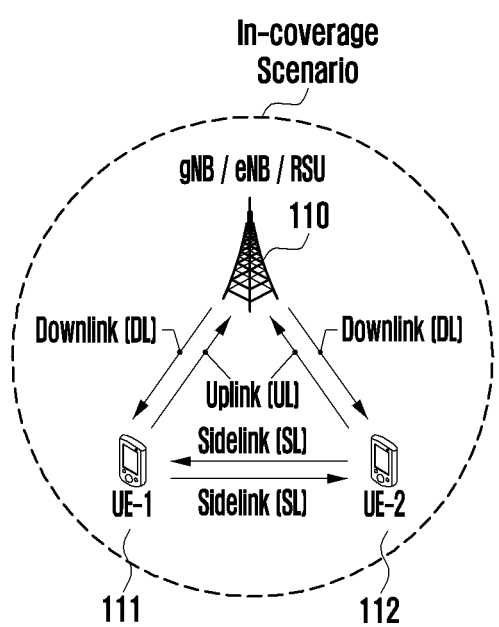
FIGS. 1A, 1B, 1C and 1D are views illustrating a system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

The following detailed description of embodiments of the disclosure is directed to New RAN (NR) as a radio access network and Packet Core as a core network (5th generation (5G) system, 5G Core Network, or new generation core (NG Core)) which are specified in the 5G mobile communication standards defined by the 3rd generation partnership project long term evolution (3rd generation partnership project (3GPP) long-term evolution (LTE)) that is a mobile communication standardization group, but based on determinations by those skilled in the art, the main idea of the disclosure may be applied to other communication systems having similar backgrounds or channel types through some modifications without significantly departing from the scope of the disclosure.

In a 5G system, in order to support network automation, a network data collection and analysis function (NWDAF), which is a network function that provides a function of analyzing and providing data collected from a 5G network, may be defined. The NWDAF can collect/storage/analyze information from the 5G network to provide the result to an unspecified network function (NF), and the analysis result can be used independently in each NF.

In the following description, the disclosure will be described using terms and names defined in the 3GPP standards (5G, NR, LTE, or other similar system standards) for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In order to meet the increasing demand for wireless data traffic after the commercialization of 4th generation (4G) communication systems, efforts are being made to develop an improved 5G communication system (new radio (NR)). In order to achieve a high data rate, the 5G communication system is designed to enable resources in the ultra-high frequency (mmWave) band (e.g., such as 28 GHz frequency band). In order to mitigate the path loss of radio waves in the ultra-high frequency band and increase the transmission distance of radio waves, in 5G communication systems, technologies, such as beamforming, massive multiple-input multiple-output (MIMO), full dimensional MIMO (FD-MIMO), array antennas, analog beam-forming, and large scale antennas have been discussed. In addition, unlike LTE system, the 5G communication system uses, as resources, various subcarrier spacings, such as 15 kHz, 30 kHz, 60 kHz, and 120 kHz, the physical control channel uses polar coding, and the physical data channel uses low density parity check (LDPC). In addition, as a waveform for uplink transmission, not only DFT-S-OFDM but also CP-OFDM is used. In the LTE system, while hybrid ARQ (HARQ) retransmission in units of transport blocks (TB) is used as a resource, in 5G, it is possible to additionally use, as a resource, HARQ retransmission based on a code block group (CBG) in which several code blocks (CBs) are grouped.

In addition, in order to improve the network of the system, technology developments, such as evolved small cells, advanced small cells, cloud radio access networks (cloud RAN), ultra-dense networks, device-to-device (D2D) communication, wireless backhaul, vehicle communication network (vehicle-to-everything (V2X)), cooperative communication, coordinated multi-points (CoMP), and reception interference cancellation are being made in 5G communication systems.

On the other hand, the Internet is evolving from a human-centered connection network in which humans generate and consume information, to an Internet of Things (IoT) network that exchanges and processes information between distributed components, such as objects. Big data processing technology through connection with cloud servers, or the like, is emerging as an Internet of Everything (IoE) technology combined with IoT technology. In order to implement IoT, technological elements, such as detection technology, wired/wireless communication and network infrastructure, service interface technology, and security technology are required, and recently, technologies, such as sensor network, machine-to-machine (M2M), and machine-type communication (MTC) for connection between objects have been studied. In the IoT environment, intelligent Internet technology (IT) services that generate new value in human life by collecting and analyzing data generated from connected objects can be provided. IoT can be applied to fields, such as smart homes, smart buildings, smart cities, smart cars or connected cars, smart grids, healthcare, smart home appliances, and advanced medical services through convergence and combination between existing information technology (IT) technology and various industries.

Accordingly, various attempts have been made to apply a 5G communication system to an IoT network. For example, technologies, such as sensor network, machine-to-machine (M2M), and machine-type communication (MTC) are implemented by techniques, such as beamforming, MIMO, and array antennas, which are 5G communication technologies. The application of a cloud radio access network (cloud RAN) as the big data processing technology described above is an example of the convergence of 5G technology and IoT technology. In this way, a plurality of services may be provided to users in a communication system, and in order to provide such a plurality of services to users, a method of providing each service within the same time period according to characteristics and an apparatus using the same are required. Various services provided in 5G communication systems are being studied, and one of them is a service that satisfies the requirements of low latency and high reliability.

In the case of vehicle communication, the new radio (NR) V2X system supports unicast communication, groupcast (or multicast) communication, and broadcast communication between terminals. In addition, unlike the LTE V2X system, which aims to transmit and receive basic safety information necessary for vehicle driving on the road, the NR V2X system aims to provide more advanced services, such as group driving (platooning), advanced driving, extended sensors, and remote driving. In addition, the NR V2X system supports a method in which the terminal directly detects and assigns sidelink transmission resources based on both periodic and aperiodic traffic. However, especially in the case of a pedestrian mobile terminal, a method and procedure for selecting a transmission resource by minimizing power consumption of the terminal may be required. Therefore, the operations of a terminal and a base station for solving this problem should be defined. However, there is no discussion about this. Accordingly, the disclosure proposes a detection and resource assignment method that optimizes power consumption of a terminal in a sidelink.

Embodiments in the disclosure have been proposed to support the above-described scenario, and in particular, a purpose of the disclosure is to provide a method and apparatus for minimizing power consumption of a terminal during detection and resource selection processes by a terminal in a sidelink. In the disclosure, the meaning of the term "detection" can include "sensing."

FIGS. 1A, 1B, 1C and 1D are a view illustrating a system according to various embodiments of the disclosure.

Referring to FIGS. 1A, 1B, 1C, and 1D, FIG. 1A illustrates an example of a case (in-coverage (IC)) in which all V2X terminals UE-1 111 and UE-2 112 are located within the coverage area of a base station 110. All V2X terminals 111 and 112 may receive data and control information from the base station 110 through a downlink (DL) or transmit data and control information to the base station through an uplink (UL). In this case, the data and control information may be data and control information for V2X communication. The data and control information may be data and control information for general cellular communication. In addition, the V2X terminals may transmit/receive data and control information for V2X communication through a sidelink (SL).

Figure 1B:
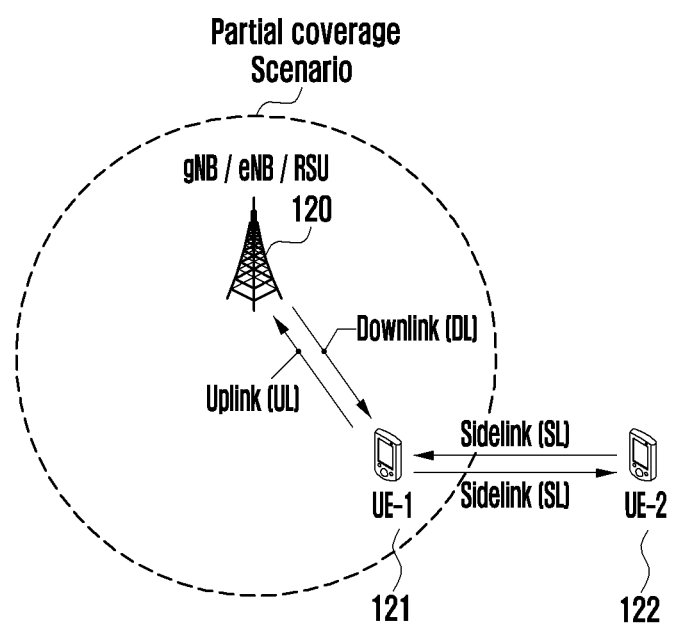
Figure 1C:
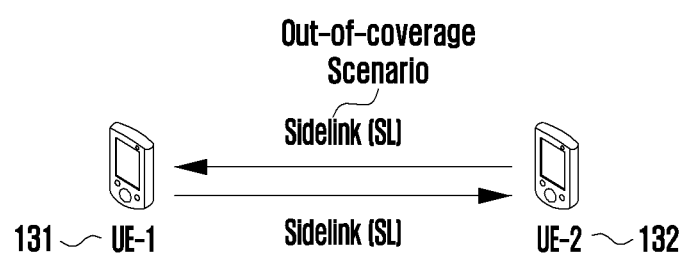

Referring to FIGS. 1A, 1B, 1C, and 1D, FIG. 1B illustrates an example of a case in which UE-1 121 is located within the coverage area of a base station 120 and UE-2 122 is located outside the coverage area of the base station 120 among the V2X terminals. For example, FIG. 1B illustrates an example of partial coverage (PC) in which the V2X terminal UE-2 122 is located outside the coverage area of the base station 120. The V2X terminal UE-1 121 located within the coverage area of the base station 120 may receive data and control information from the base station 120 through downlink or transmit data and control information to the base station 120 through uplink. The V2X terminal UE-2 122 located outside the coverage area of the base station 120 cannot receive data and control information from the base station 120 through downlink, and cannot transmit data and control information to the base station 120 through uplink. The V2X terminal UE-2 122 can transmit/receive data and control information for V2X communication through the sidelink with the V2X terminal UE-1.

Referring to FIGS. 1A, 1B, 1C, and 1D, FIG. 1C illustrates an example of a case in which all V2X terminals 131 and 132 are located out of coverage (OOC) of a base station. Therefore, the V2X terminals UE-1 131 and UE-2 132 cannot receive data and control information from the base station through downlink, and cannot transmit data and control information to the base station through uplink. The V2X terminals UE-1 131 and UE-2 132 can transmit/receive data and control information for V2X communication through the sidelink.

Figure 1D:
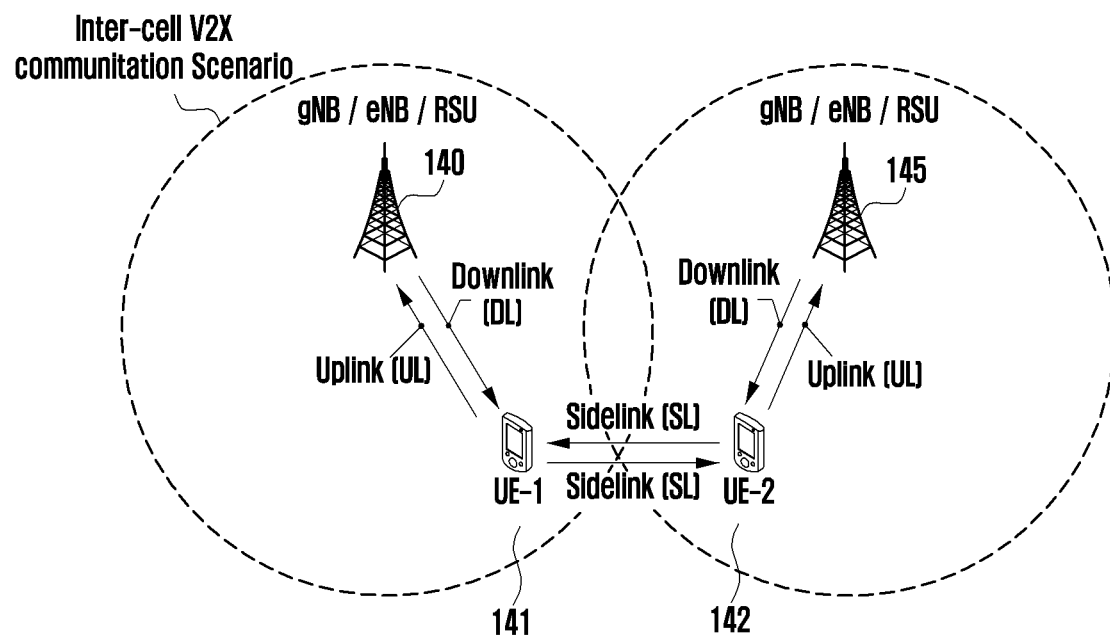

Referring to FIGS. 1A, 1B, 1C, and 1D, FIG. 1D illustrates an example of a scenario for performing V2X communication between V2X terminals UE-1 141 and UE-2 142 located in different cells. Specifically, FIG. 1D illustrates a case in which the V2X terminals UE-1 141 and UE-2 142 are connected to different base stations 140 and 145 (radio resource control (RRC) connection state) or camping (RRC connection release state, that is, RRC idle state). In this case, the V2X terminal UE-1 141 may be a V2X transmitting terminal and the V2X terminal UE-2 142 may be a V2X receiving terminal. Alternatively, the V2X terminal UE-1 141 may be a V2X receiving terminal, and the V2X terminal UE-2 142 may be a V2X transmitting terminal. The V2X terminal UE-1 141 may receive a system information block (SIB) from the base station 140 to which it has accessed (or on which it is camping), and the V2X terminal UE-2 142 may receive an SIB from another base station 145 to which it is connected (or on which it is camping). In this case, as the SIB, an existing SIB may be used, or a separately defined SIB for V2X may be used. In addition, information of the SIB received by the V2X terminal UE-1 141 and information of the SIB received by the V2X terminal UE-2 142 may be different from each other. Therefore, in order to perform V2X communication between terminals UE-1 141 and UE-2 142 located in different cells, a method of interpreting SIB information transmitted from different cells may be additionally required by unifying the information or by signaling the information.

In FIGS. 1A, 1B, 1C, and 1D, for convenience of description, a V2X system consisting of V2X terminals UE-1 and UE-2 is illustrated, but the disclosure is not limited thereto, and communication between more V2X terminals may be achieved. In addition, the interface (uplink and downlink) between the base station and the V2X terminals may be referred to as Uu interfaces, and the sidelink between the V2X terminals may be referred to as the PC5 interface. Therefore, in the disclosure, the terms can be mixed and used. Meanwhile, in the disclosure, the terminal may include a vehicle that supports vehicle-to-vehicular communication (vehicle-to-vehicle (V2V)), a vehicle that supports vehicle-to-pedestrian communication (vehicle-to-pedestrian (V2P)) or a pedestrian's handset (e.g., a smartphone), a vehicle that supports communication between networks (vehicle-to-network (V2N), or a vehicle that supports communication between a vehicle and a transportation infrastructure (vehicle-to-infrastructure (V21)). In addition, in the disclosure, the terminal may include a road side unit (RSU) equipped with a terminal function, an RSU equipped with a base station function, or an RSU equipped with a part of the base station function and a part of the terminal function.

Further, according to an embodiment of the disclosure, the base station may be a base station supporting both V2X communication and general cellular communication, or may be a base station supporting only V2X communication. In this case, the base station may be a 5G base station (gNB), a 4G base station (eNB), or an RSU. Therefore, in this disclosure, the base station may be referred to as an RSU.

Figure 2A:
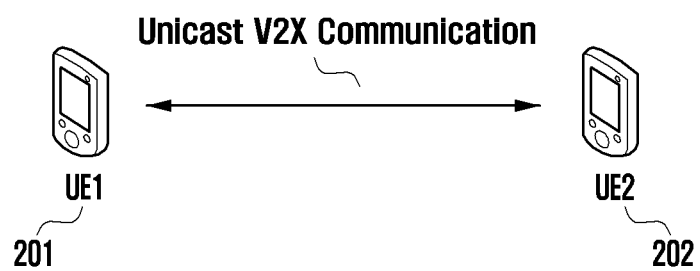
FIGS. 2A and 2B are diagrams illustrating a vehicle-to-everything (V2X) communication method performed through a sidelink according to various embodiments of the disclosure.
Figure 2B:
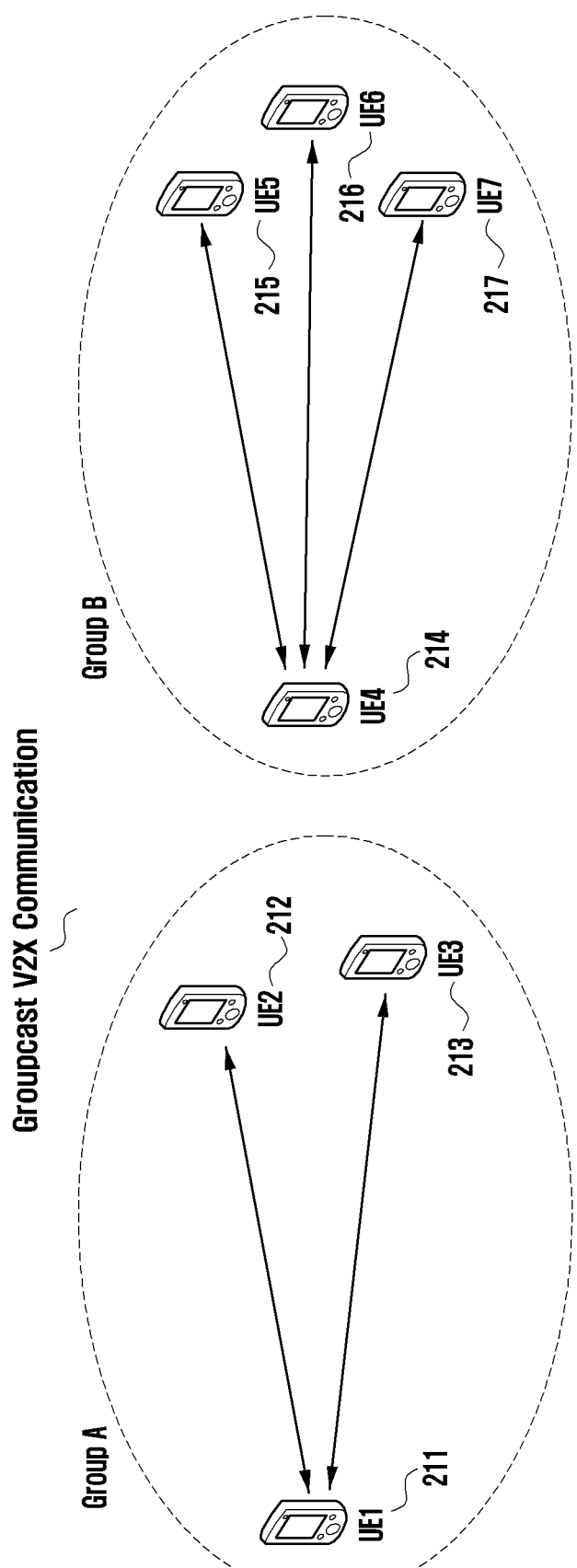

FIGS. 2A and 2B are diagrams illustrating a V2X communication method performed through a sidelink according to various embodiments of the disclosure.

Referring to FIG. 2A, UE-1 201 (e.g., a TX terminal) and UE-2 202 (e.g., a RX terminal) can perform one-to-one communication, and it can be called unicast communication.

Referring to FIG. 2B, the TX terminal and the RX terminal may perform one-to-many communication, which may be referred to as groupcast or multicast. In FIG. 2B, UE-1 211, UE-2 212, and UE-3 213 may form a group (Group A) to perform groupcast communication, and, UE-4 214, UE-5 215, UE-6 216, and UE-7 217 may form another group (Group B) to perform groupcast communication. Each terminal performs groupcast communication only within a group to which it belongs, and communication between different groups may be performed through unicast, groupcast, or broadcast communication. FIG. 2B illustrates that two groups (Group A and Group B) are formed, but are not limited thereto.

Meanwhile, although not illustrated in FIGS. 2A and 2B, the V2X terminals may perform broadcast communication. Broadcast communication refers to a case where all V2X terminals receive data and control information transmitted by a V2X transmitting terminal through a sidelink. As an example, if it is assumed that UE-1 211 is a transmitting terminal for broadcast in FIG. 2B, all terminals UE-2 212, UE-3 213, UE-4 214, UE-5 215, UE-6 216, and UE-7 217 may receive data and control information transmitted by UE-1 211.

In NR V2X, unlike in LTE V2X, support in a form in which a vehicle terminal transmits data to only one specific node through unicast and a form in which data is transmitted to a plurality of specific nodes through groupcast may be considered. For example, in a service scenario, such as platooning, which is a technology that connects two or more vehicles through a single network and causes the vehicles to move in a cluster form, such unicast and groupcast technologies may be usefully used. Specifically, unicast communication may be required for the purpose of a group leader node connected by platooning to control one specific node, and groupcast communication may be required for the purpose of simultaneously controlling a group consisting of a specific number of nodes.

Figure 3:
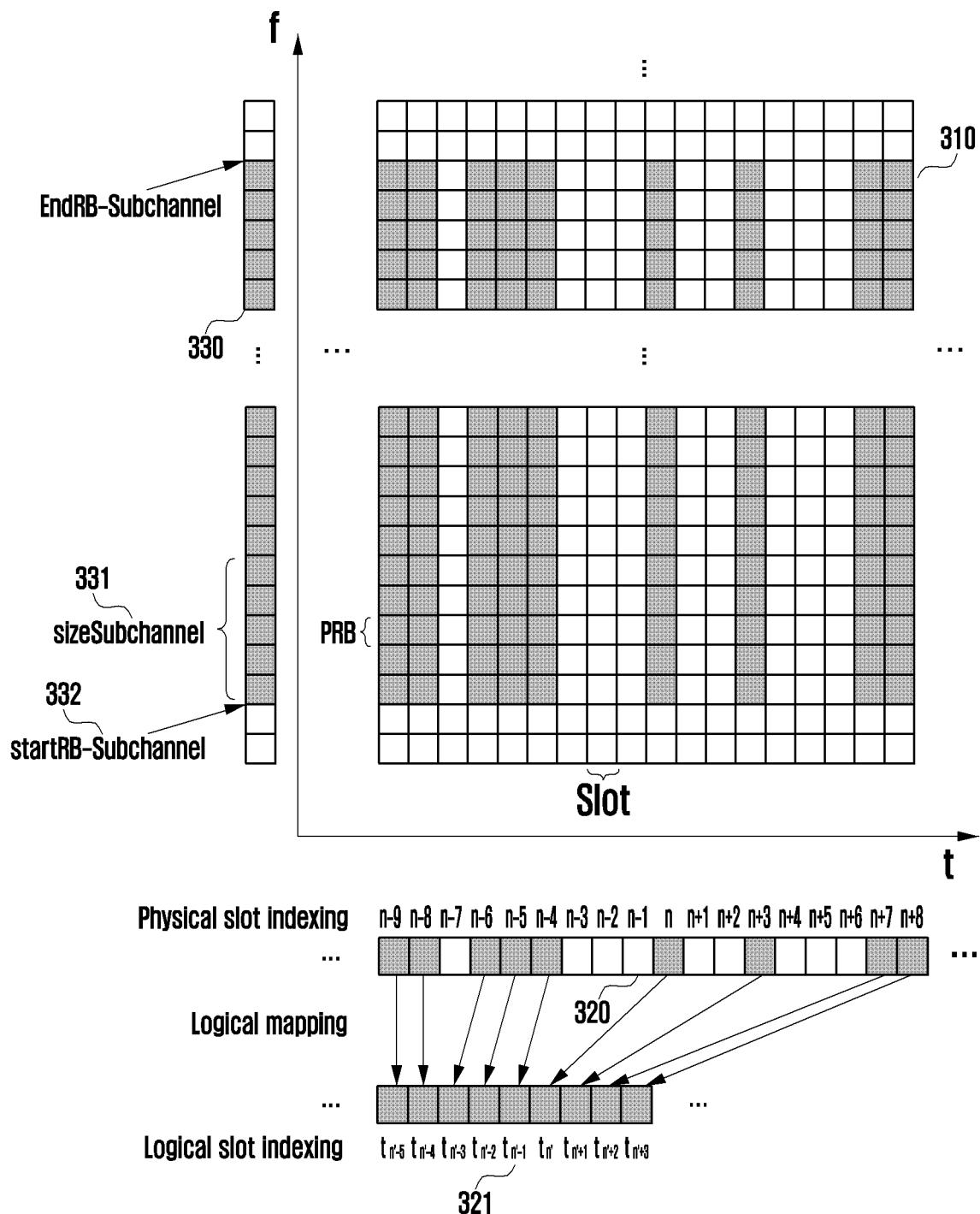
FIG. 3 is a diagram illustrating a resource pool defined as a set of resources on a time and frequency used for transmission and reception of a sidelink according to an embodiment of the disclosure.

FIG. 3 is a diagram illustrating a resource pool defined as a set of resources on a time and frequency used for transmission and reception of a sidelink according to an embodiment of the disclosure.

In the resource pool, the resource granularity of the time axis may be a slot. In addition, the resource assignment unit on the frequency axis may be a subchannel composed of one or more physical resource blocks (PRBs).

When the resource pool is assigned on time and frequency (310), a colored area indicates a region set as a resource pool on time and frequency. In the disclosure, an example of a case in which the resource pool is non-contiguously assigned over time is described, but the resource pool may be continuously assigned over time. In addition, although the disclosure describes an example in which a resource pool is continuously assigned on a frequency, a method in which the resource pool is non-contiguously assigned on a frequency is not excluded.

Referring to FIG. 3, a case 320 in which a resource pool is assigned non-contiguously over time is illustrated. Referring to FIG. 3, a case in which a granularity of resource assignment over time is made of a slot is illustrated. Specifically, one slot composed of a plurality of OFDM symbols may be a basic unit of resource assignment on the time axis. In this case, all OFDM symbols constituting the slot may be used for sidelink transmission, or some of the OFDM symbols constituting the slot may be used for sidelink transmission. For example, some of the slots may be used as downlink/uplink used as a Uu interface between base station terminals. Referring to FIG. 3, a colored slot represents a slot included in a resource pool in time, and a slot assigned to the resource pool may be (pre-)configured with resource pool information in time. For example, resource pool information in time may be indicated as a bitmap through the SIB.

Referring to FIG. 3, a physical slot 320 belonging to a non-contiguous resource pool in time may be mapped to a logical slot 321. In general, a set of slots belonging to a physical sidelink shared channel (PSSCH) resource pool may be represented by (t0, t1, . . . , ti, . . . , tTmax).

Referring to FIG. 3, a case 330 in which a resource pool is continuously assigned on a frequency is illustrated.

Resource assignment in the frequency axis may be performed in units of sub-channels 331. The subchannel 331 may be defined as a resource assignment unit on a frequency composed of one or more RBs. For example, the subchannel 331 may be defined as an integer multiple of RB. Referring to FIG. 3, a subchannel 331 may be composed of five consecutive PRBs, and a size of a subchannel (sizeSubchannel) may be a size of five consecutive PRBs. However, the contents illustrated in the drawings are only an example of the disclosure, and the size of the subchannel may be configured differently, and one subchannel is generally configured as a continuous PRB, but it is not necessarily configured as a continuous PRB. The subchannel 331 may be a basic unit of resource assignment for PSSCH.

The startRB-Subchannel 332 may indicate the start position of the subchannel 331 on a frequency in the resource pool. When resource assignment is performed in units of subchannels 331 on the frequency axis, resources on a frequency may be assigned through configuration information about the RB index (startRB-Subchannel, 332) at which the subchannel 331 starts, information on how many RBs the subchannel 331 consists of (sizeSubchannel), the total number of subchannels 331 (numSubchannel), or the like. In this case, information about the startRB-Subchannel, sizeSubchannel, and numSubchannel may be (pre-)configured as resource pool information on frequency. For example, the frequency resource pool information may be configured and indicated through the SIB.

Figure 4:
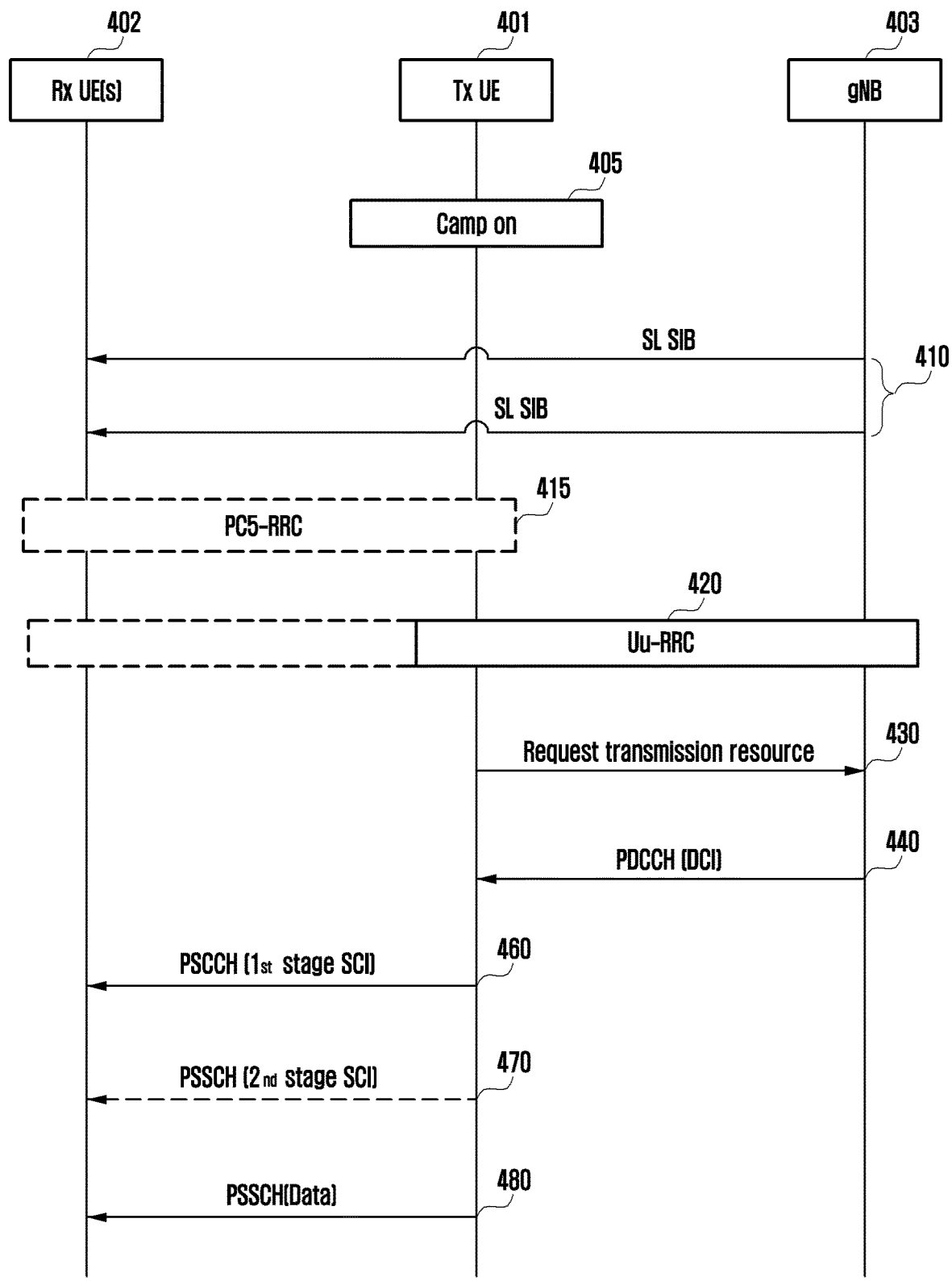
FIG. 4 is a diagram illustrating a method for a base station to allocate transmission resources in a sidelink according to an embodiment of the disclosure.

FIG. 4 is a diagram illustrating a method for a base station to allocate transmission resources in a sidelink according to an embodiment of the disclosure.

A method for the base station to allocate transmission resources in the sidelink will be referred to as Mode 1 below. Mode 1 may be a scheduled resource assignment. Mode 1 may represent a method in which the base station allocates resources used for sidelink transmission to RRC-connected terminals in a dedicated scheduling scheme. The mode 1 method may be effective for interference management and resource pool management because the base station can manage the resources of the sidelink.

Referring to FIG. 4, the transmitting terminal 401 and the receiving terminal 402 camping on (405) may receive a sidelink system information block (SL-SIB) from the base station 403 in operation 410. Here, the receiving terminal 402 represents a terminal that receives sidelink data transmitted by the transmitting terminal 401. The SL-SIB information may include sidelink resource pool information for sidelink transmission/reception, parameter setting information for detection operation, information for setting sidelink synchronization, or carrier information for sidelink transmission/reception operating at different frequencies.

When data traffic for V2X is generated in the transmitting terminal 401, the transmitting terminal 401 may be RRC connected to the base station 403 in operation 420. Here, the RRC connection between the terminal and the base station may be referred to as Uu-RRC. The Uu-RRC connection process 420 may be performed before the transmission terminal 401 generates data traffic. In addition, in Mode 1, while the Uu-RRC connection process 420 between the base station 403 and the receiving terminal 402 is performed, the transmitting terminal may perform transmission to the receiving terminal through a sidelink. In contrast, in Mode 1, the transmitting terminal may perform transmission to the receiving terminal through the sidelink even when the Uu-RRC connection process 420 between the base station 403 and the receiving terminal 402 is not performed.

The transmitting terminal 401 may request a transmission resource capable of V2X communication with the receiving terminal 402 from the base station in operation 430. In this case, the transmitting terminal 401 may request a sidelink transmission resource from the base station 403 using a physical uplink control channel (PUCCH), an RRC message, or a medium access control (MAC) control element (CE). Meanwhile, the MAC CE may be a buffer status report (BSR) MAC CE of a new format (including at least an indicator indicating the buffer status report for V2X communication and information on the size of data buffered for D2D communication). In addition, the transmitting terminal 401 may request a sidelink resource through a scheduling request (SR) bit transmitted through an uplink physical control channel.

Thereafter, the base station 403 may allocate a V2X transmission resource to the transmission terminal 401. In this case, the base station may allocate transmission resources in a dynamic grant scheme or a configured grant scheme.

First, in the case of the dynamic grant scheme, the base station may allocate resources for TB transmission through downlink control information (DCI). The sidelink scheduling information included in the DCI may include parameters related to the initial transmission and retransmission transmission time and frequency assignment location information fields. The DCI for the dynamic grant method may be cyclic redundancy check (CRC) scrambled with SL-V-RNTI to indicate that it is a dynamic grant scheme.

Thereafter, in the case of the configured grant scheme, the base station may periodically allocate resources for TB transmission by configuring a semi-persistent scheduling (SPS) interval through Uu-RRC. In this case, the base station may allocate resources for one TB through DCI. Sidelink scheduling information for one TB included in the DCI may include parameters related to initial transmission and retransmission resource transmission times and frequency assignment location information. When resources are assigned in the configured grant scheme, the transmission time (occasion) and frequency assignment position of the initial transmission and retransmission for one TB may be determined by the DCI, and the resource for the next TB may be repeated at SPS interval intervals. DCI for the configured grant scheme may be CRC scrambled with SL-SPS-V-RNTI to indicate the configured grant scheme. In addition, the configured grant (CG) scheme can be divided into type1 CG and type2 CG. In the case of Type2 CG, it is possible to activate/deactivate resources set as configured grant through DCI.

Therefore, in the case of Mode 1, the base station 403 may instruct the transmitting terminal 401 to schedule for sidelink communication with the receiving terminal 402 through DCI transmission through the PDCCH in operation 440.

In the case of broadcast transmission, the transmitting terminal 401 may broadcast the SCI (1st stage) to the receiving terminal 402 through the PSCCH by broadcast without the RRC configuration 415 for the sidelink in operation 460. In addition, the transmitting terminal 401 may broadcast data to the receiving terminal 402 through the PSSCH (480). In the case of broadcast transmission, SCI transmission (2nd stage SCI in operation 470 through PSSCH might not be performed.

In contrast, in the case of unicast or groupcast transmission, the transmitting terminal 401 may perform a one-to-one RRC connection with another terminal Here, the RRC connection between terminals may be referred to as PC5-RRC 415, distinguishing it from Uu-RRC. Even in the case of groupcast, the PC5-RRC 415 may be individually connected between the terminal and the terminal in the group. Referring to FIG. 4, although the connection of the PC5-RRC 415 is shown as an operation after transmission 410 of SL-SIB, it may be performed at any time before transmission 410 of SL-SIB or transmission of SCI. If the RRC connection between the terminals is required, the PC5-RRC connection of the sidelink may be performed, and the transmitting terminal 401 may transmit the SCI (1st stage) to the receiving terminal 402 through the PSCCH in unicast or groupcast in operation 460. In this case, the groupcast transmission of SCI may be interpreted as a group SCI. In addition, the transmitting terminal 401 may transmit the SCI (2nd stage) to the receiving terminal 402 through the PSSCH in unicast or groupcast in operation 470. In this case, information related to resource assignment may be included in the 1st stage SCI, and control information other than that may be included in the 2nd stage SCI. In addition, the transmitting terminal 401 may transmit data to the receiving terminal 402 through the PSSCH in unicast or groupcast in operation 480.

Figure 5:
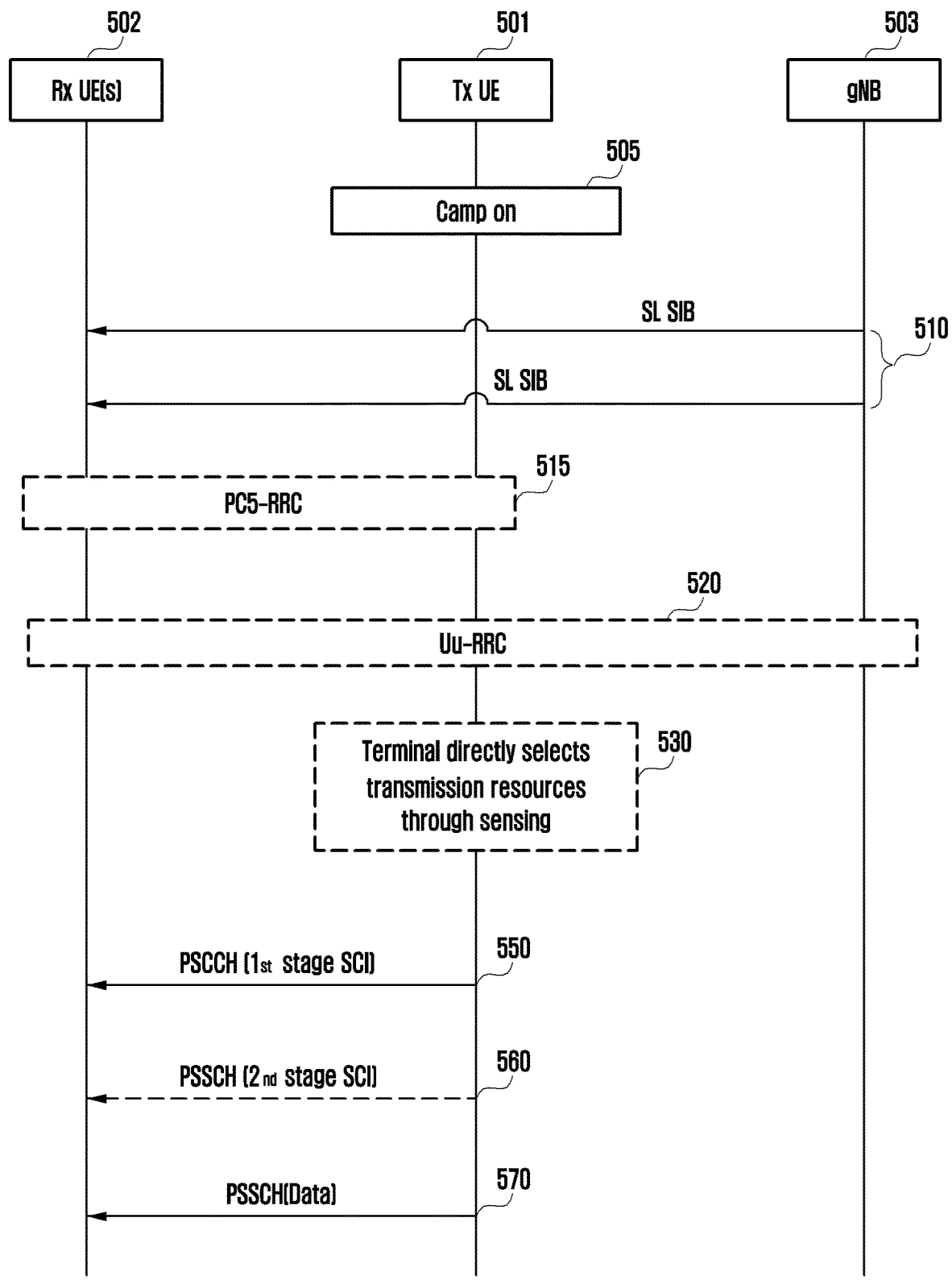
FIG. 5 is a diagram illustrating a method of directly allocating a transmission resource of a sidelink through detection by a terminal in a sidelink according to an embodiment of the disclosure.

FIG. 5 is a diagram illustrating a method of directly allocating a transmission resource of a sidelink through detection by a terminal in a sidelink according to an embodiment of the disclosure. Hereinafter, a method in which the UE directly allocates sidelink transmission resources through detection in the sidelink is referred to as Mode 2. In the case of Mode 2, it may also be referred to as UE autonomous resource selection. In Mode 2, a base station 503 may provide a pool of sidelink transmission/reception resources for V2X as system information, and a transmitting terminal 501 may select a transmission resource according to a predetermined rule. Unlike Mode 1, in which the base station is directly involved in resource assignment, in FIG. 5, there is a difference in that the transmitting terminal 501 autonomously selects a resource and transmits data, based on a resource pool previously received through system information.

Referring to FIG. 5, the transmitting terminal 501 and a receiving terminal 502 camping on (505) may receive SL-SIBs from the base station 503 in operation 510. Here, a receiving terminal 502 represents a terminal that receives data transmitted by the transmitting terminal 501. The SL-SIB information may include sidelink resource pool information for sidelink transmission/reception, parameter configuration information for detection operation, information for configuring sidelink synchronization, or carrier information for sidelink transmission/reception operating at different frequencies.

The difference between FIG. 4 and FIG. 5 is that, in the case of FIG. 4, the base station 503 and the transmitting terminal 501 operate in an RRC connected state, while in FIG. 5, the terminal can operate in an idle mode 520 (a state in which RRC is not connected). In addition, even in the RRC connection state 520, the base station 503 does not directly participate in resource assignment and allows the transmitting terminal 501 to autonomously select a transmission resource. Here, the RRC connection between the transmitting terminal 501 and the base station 503 may be referred to as a Uu-RRC in operation 520. When data traffic for V2X is generated in the transmitting terminal 501, the transmitting terminal 501 may be configured with a resource pool through system information received from the base station 503, and the transmitting terminal 501 may directly select a resource in the time/frequency domain through detection within the configured resource pool in operation 530.

In the case of broadcast transmission, the transmitting terminal 501 may broadcast the SCI ($1^{st}$ stage) to the receiving terminal 502 through the PSCCH by broadcast without the RRC configuring in operation 520 for the sidelink in operation 550. In addition, the transmitting terminal 501 may broadcast data to the receiving terminal 502 through the PSSCH in operation 560. In the case of broadcast transmission, SCI transmission ($2^{nd}$ stage SCI 470) through PSSCH might not be performed.

In contrast, in the case of unicast and groupcast transmission, the transmitting terminal 501 may perform a one-to-one RRC connection with other terminals. Here, separate from Uu-RRC, the RRC connection between terminals may be PC5-RRC. Even in the case of groupcast, PC5-RRC may be individually connected between terminals in the group. In FIG. 5, the connection of the PC5-RRC 515 is illustrated as an operation after transmission 510 of SL-SIB, but may be performed at any time before transmission 510 of SL-SIB or transmission 550 of SCI. If the RRC connection between the terminals is required, the sidelink PC5-RRC connection may be performed in operation 515, and the transmitting terminal 501 may transmit the SCI ($1^{st}$ stage) to the receiving terminal 502 through the PSCCH in unicast or groupcast in operation 550. In this case, the groupcast transmission of SCI may be interpreted as a group SCI. In addition, the transmitting terminal 501 may transmit the SCI ($2^{nd}$ stage)

to the receiving terminal 502 through the PSSCH in unicast or groupcast in operation 560. In this case, information related to resource assignment may be included in the 1st stage SCI, and control information other than that may be included in the 2nd stage SCI. In addition, the transmitting terminal 501 may transmit data to the receiving terminal 502 through the PSSCH in unicast or groupcast in operation 570.

Figure 6:
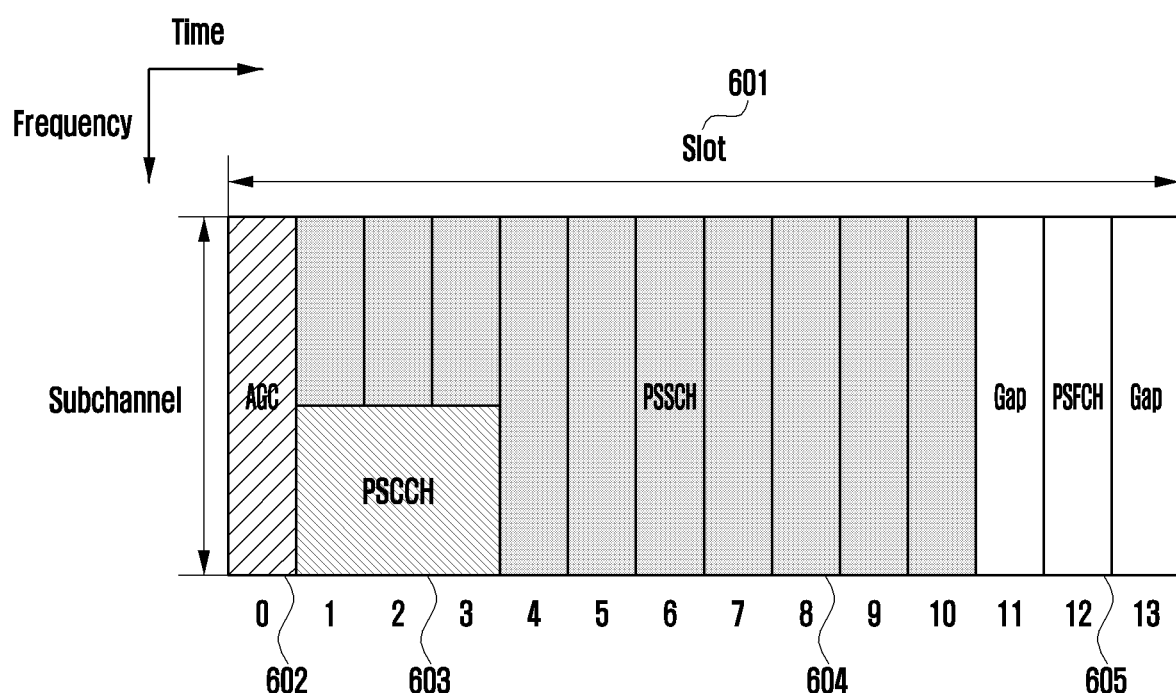
FIG. 6 is a diagram illustrating a mapping structure of physical channels mapped to one slot in a sidelink according to an embodiment of the disclosure.

FIG. 6 is a diagram illustrating a mapping structure of physical channels mapped to one slot in a sidelink according to an embodiment of the disclosure.

Referring to FIG. 6, it illustrates mapping for physical channels, such as PSCCH/PSSCH/physical sidelink feedback channel (PSFCH). The PSCCH/PSSCH/PSFCH may be allocated to one or more subchannels on a frequency domain. For details on subchannel assignment, the description of FIG. 3 will be referred to. Thereafter, referring to FIG. 6 to describe the temporal mapping of PSCCH/PSSCH/PSFCH, one or more symbols before the transmitting terminal transmits the PSCCH/PSSCH/PSFCH in the corresponding slot 601 may be used as the region 602 for the AGC. When the corresponding symbol(s) is used for automatic gain control (AGC), a method of repetition and transmission of signals of other channels in the corresponding symbol region 602 may be considered. In this case, a part of a PSCCH symbol or a PSSCH symbol may be considered for the repeated signal of another channel. Alternatively, a preamble may be transmitted to the AGC region. When a preamble signal is transmitted, there is an advantage in that the AGC execution time can be shorter than a method of repeatedly transmitting signals of other channels. When a preamble signal is transmitted for AGC, a specific sequence may be used as the preamble signal 602, and in this case, a sequence, such as a PSSCH demodulation reference signal (DMRS), a PSCCH DMRS, and a channel state information reference signal (CSI-RS) may be used as the preamble. The sequence used as a preamble in the disclosure is not limited to the above-described example. Additionally, according to FIG. 6, a PSCCH 603 including control information may be transmitted in initial symbols of a slot, and data scheduled by the control information of the PSCCH 603 may be transmitted to the PSSCH 604. A part ($1^{st}$ stage SCI) of sidelink control information (SCI), which is control information, may be mapped to the PSCCH 603 and transmitted. In the PSSCH 604, not only data information, but also another part ($2^{nd}$ stage SCI) of SCI, which is control information, may be mapped and transmitted. In addition, FIG. 6 illustrates that a physical sidelink feedback channel (PSFCH 605), which is a physical channel for transmitting feedback information, is located at the end of a slot. A predetermined vacant time (Gap) may be secured between the PSSCH 604 and the PSFCH 605 so that the UEs that have transmitted/received the PSSCH 604 can prepare to transmit or receive the PSFCH 605. In addition, after transmission and reception of the PSFCH 605, an empty section (Gap) can be secured for a predetermined time.

Figure 7:
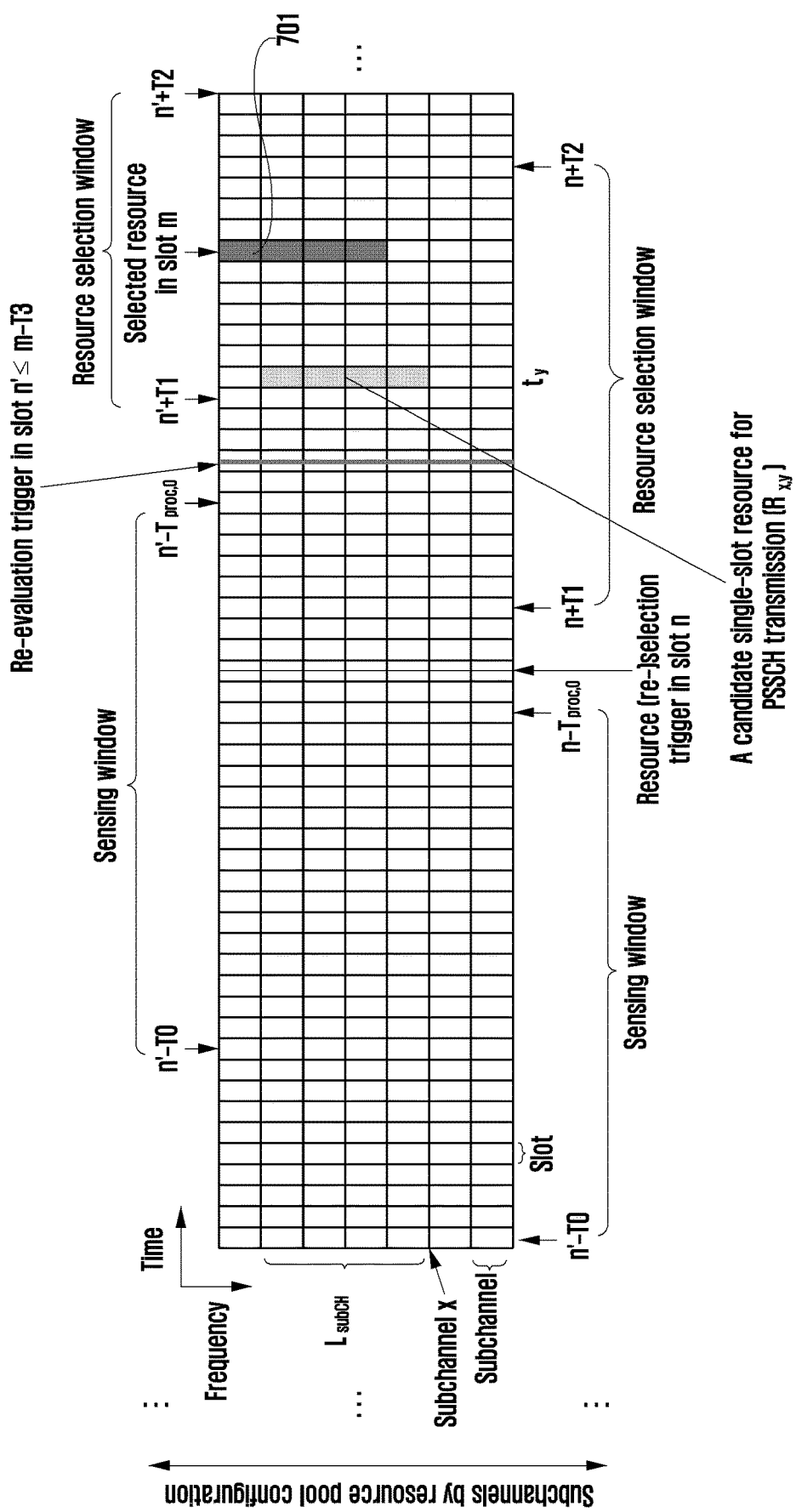
FIG. 7 is a diagram illustrating a method of selecting a resource and reselecting a resource by a terminal in Mode 2 according to an embodiment of the disclosure.

FIG. 7 is a diagram illustrating a method of selecting a resource and reselecting a resource by a terminal in Mode2 according to an embodiment of the disclosure.

Referring to FIG. 7, it illustrates a case in which triggering for resource selection is performed at time n, and triggering for re-evaluation is performed at n' (n'>n) by continuously detecting even after triggering time n. Referring to FIG. 7, when triggering for resource selection is performed at time n, the detection window may be defined as [n-T0, n-Tproc, 0). Here, T0 is the starting point of the detection window and may be (pre-)configured as resource pool information. In addition, Tproc,0 may be defined as a time required to process the detection result, and the required Tproc,0 may vary according to the configured T0 value. Specifically, when a long T0 value is configured, a long Tproc,0 may be required. Conversely, when a short T0 value is configured, a short Tproc,0 may be required. Accordingly, the Tproc,0 value may be fixed to one value, but another value adjusted by the configured T0 value may be (pre-)configured as resource pool information. Thereafter, when triggering for resource selection is performed at time n, the resource selection window may be determined as [n+T1, n+T2]. Here, T1 may be selected as a terminal implementation for T1≤Tproc,1. Tproc,1 is the maximum reference value in which the processing time required to select a resource is considered, and since this processing time may vary according to the terminal implementation, T1 may be selected as a value less than Tproc,1 by the terminal implementation. In addition, assuming that T2 is configured to select Nmax resources for one TB, the resources of Nmax may include initial transmission and retransmission resources. In this case, the UE selects T2 within a range that satisfies the T2≤packet delay budget (PDP). Thereafter, when triggering for re-evaluation occurs at n' (n'>n) by continuously performing detection even after triggering, referring to FIG. 7, this means that when at least an already selected resource is in slot m (701), triggering for reselection should be performed before m-T3. Here, T3 may be a processing time required for re-selection. As a first method, a method of using the resource selection processing time T1 already selected according to the UE implementation as T3 as it is can be considered (T3=T1). However, in the re-evaluation process, additional processing time for resource selection may be required. Specifically, time required for dropping the previously selected resource may be required, as well as the time required to process it in a case where the previous resource and the new resource overlap. Therefore, a method of configuring T3=Tproc,1 can be considered. This is because Tproc,1 is the maximum reference value in which the processing time required to select a resource is considered, so if triggering for reselection is performed before the corresponding value, it may be possible to change the selected resource to another resource. As illustrated in FIG. 7, when triggering for re-evaluation occurs at n' (n'>n), the detection window for this may be [n'-T0, n'-Tproc,0], and the resource selection window for this may be determined as [n'+T1, n'+T2]. In this case, the value of T0 and Tproc,0 may be the same values as the values used when triggering for resource selection is performed at time n. However, for T1 and T2, depending on the implementation, the terminal may select the same value as at point n when triggering for resource selection is performed, but other values may be selected.

Figure 8:
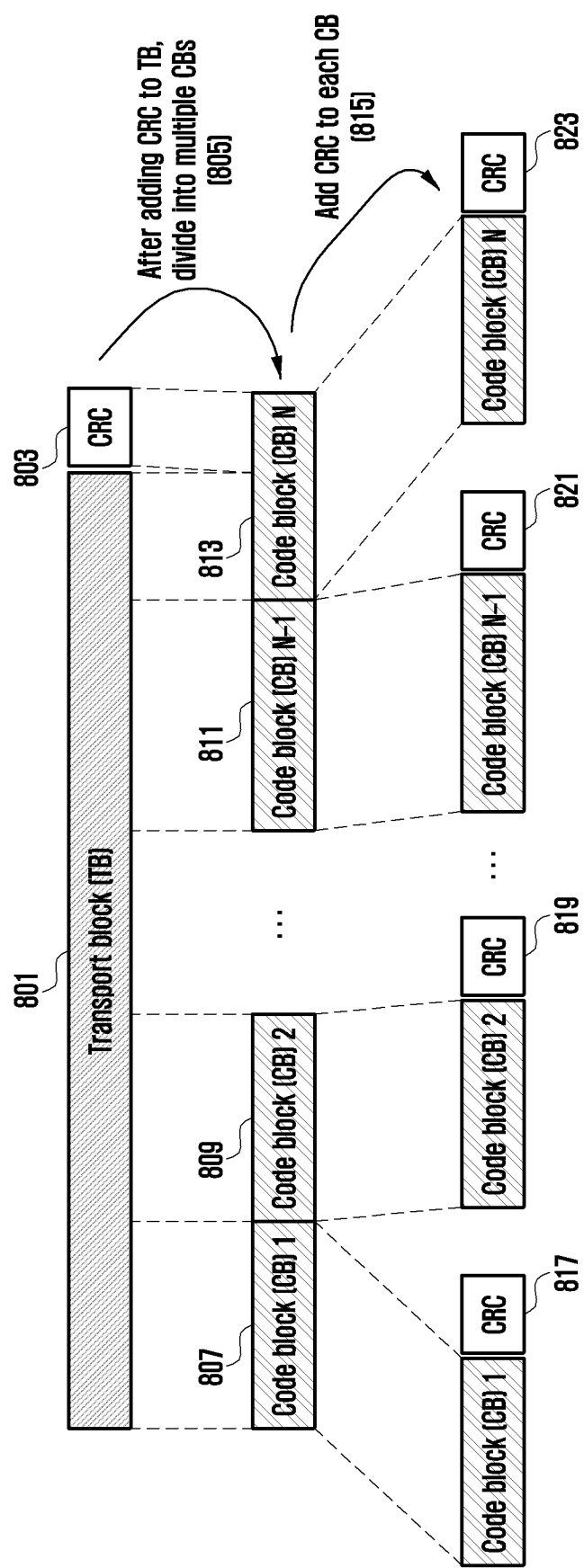
FIG. 8 is a diagram illustrating a process in which one transport block is divided into several code blocks and a cyclic redundancy check (CRC) is added according to an embodiment of the disclosure.

FIG. 8 is a diagram illustrating a process in which one transport block is divided into several code blocks and a CRC is added according to an embodiment of the disclosure.

Referring to FIG. 8, a CRC 803 may be added to the last or first part of one transport block 801 to be transmitted in uplink or downlink. The CRC may have 16 bits or 24 bits, a predetermined number of bits, or a variable number of bits according to a channel condition, and may be used to determine whether channel coding is successful. The blocks 801 and 803 to which the CRC is added to the TB can be divided into several code blocks (CBs), 807, 809, 811, and 813) (805). The maximum size of the code blocks may be predetermined and thus can be divided. In this case, the last code block 813 may be smaller in size than other code blocks, or may be adjusted to have the same length as other code blocks by inserting 0, a random value, or 1. CRCs 817, 819, 821, and 823 may be added to the divided code blocks (815). The CRC may have 16 bits, 24 bits, or a predetermined number of bits, and may be used to determine whether channel coding is successful.

To generate the CRC 803, the TB 801 and a cyclic generator polynomial may be used, and the cyclic generation polynomial may be defined in various ways. For example, assuming a cyclic generation polynomial $g_{CRC24A}(D)=[D^{24}+D^{23}+D^{18}+D^{17}+D^{14}+D^{11}+D^{10}+D^7+D^6+D^5+D^4+D^3+D+1]$ for 24-bit CRC, and assuming L=24, for TB data $a_0, a_1, a_2, a_3, \ldots, a_{A-1}$, CRC $p_0, p_1, p_2, p_3, \ldots, p_{L-1}$ divides $a_0 D^{A+23} + a_1 D^{A+22} + \ldots + a_{A-1} D^{24} + p_0 D^{23} + p_1 D^{22} + \ldots + p_{22} D^1 + p^{23}$ by $g_{CRC24A}(D)$ to determine $p_0, p_1, p_2, p_3, \ldots, p_{L-1}$ as a value whose remainder becomes 0. An example in which the CRC length L is 24 has been described above, but the length may be determined in various lengths, such as 12, 16, 24, 32, 40, 48, 64, or the like.

After adding the CRC to the TB in the above process, the transmitter divides it into N CBs (807, 809, 811, 813) (805). CRCs 817, 819, 821, 823 are added to each of the divided CBs 807, 809, 811, and 813 (815). As for the CRC added to the CB, a CRC of a length different from when generating the CRC added to the TB or a different cyclic generation polynomial may be used. However, the CRC 803 added to the TB and the CRCs 817, 819, 821, and 823 added to the code block may be omitted depending on the type of channel code to be applied to the code block. For example, when a low-density parity-check (LDPC) code rather than a turbo code is applied to a code block, the CRCs 817, 819, 821, and 823 to be inserted for each code block may be omitted. However, even when LDPC is applied, the CRCs 817, 819, 821, and 823 may be added to the code block as it is. In addition, even when a polar code is used, a CRC may be added or omitted.

As described above in FIG. 8, as for the TB to be transmitted, the maximum length of one code block may be determined according to the type of channel coding applied, and the TB and the CRC added to the TB may be divided into code blocks depending on the maximum length of the code block.

In the LTE system of the related art, a CRC for CB is added to the divided CB, the data bits and CRC of the CB are encoded with a channel code, coded bits are determined, and the number of rate-matched bits may be determined for each of the coded bits as promised in advance.

The following embodiment is to propose a method for minimizing power consumption of the terminal in the process (Mode2) of the terminal performing detection and resource selection in the above-described sidelink, and the operation of the terminal and the base station according to the proposed method.

First Embodiment

The first embodiment provides a method and apparatus for allocating a frequency-time resource to a receiving terminal in a process in which a terminal performs detection and resource selection and transmits data in a sidelink.

The information for allocating up to Nmax frequency-time resources may be transmitted by the transmitting terminal to the receiving terminal in sidelink control information. The Nmax may be a configured value, and for example, may be set to 2 or 3. For example, when Nmax is configured as 3, up to 3 pieces of resource assignment information may be delivered in SCI. Of course, when Nmax is configured as 3, only one piece of resource assignment information may be delivered, only two pieces of resource assignment information may be delivered, or three pieces of resource assignment information may be delivered. The range of frequency-time resources that can be assigned in the above may be given by W. For example, the time range of the assigned resources that can be indicated by the SCI may be W. The W may be given as the number of slots. For example, W may be given as 32, which means that Nmax pieces of resource assignment information can be delivered in the SCI within 32 slots.

Figure 9A:
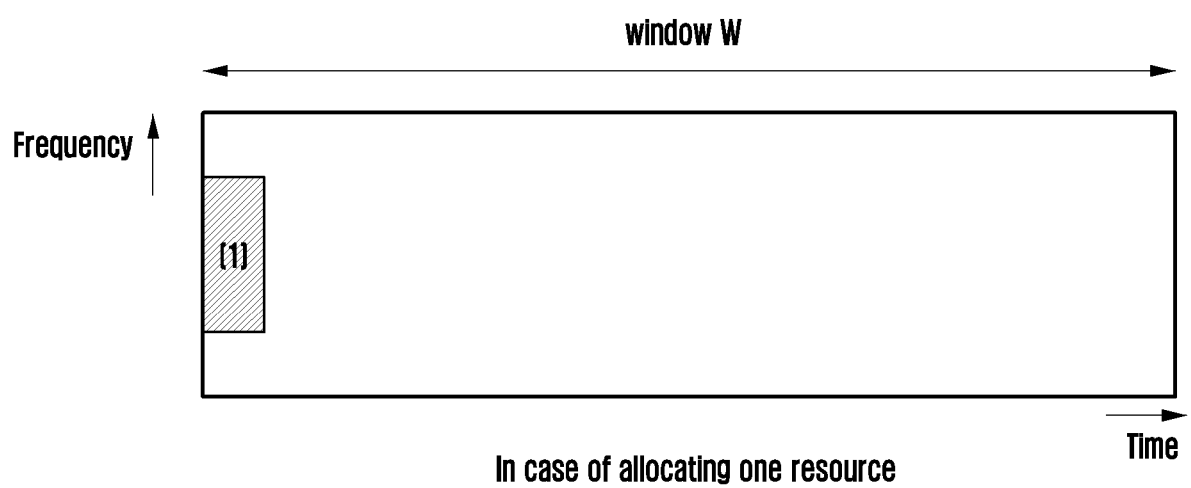
FIGS. 9A, 9B, and 9C are diagrams illustrating one, two, or three frequency-time resources are allocated and indicated according to various embodiments of the disclosure.
Figure 9B:
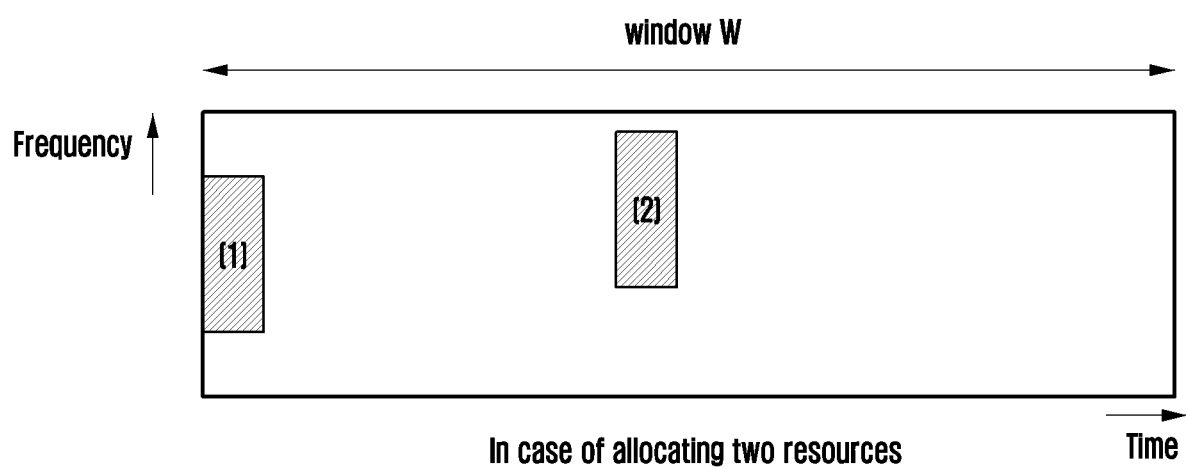
Figure 9C:
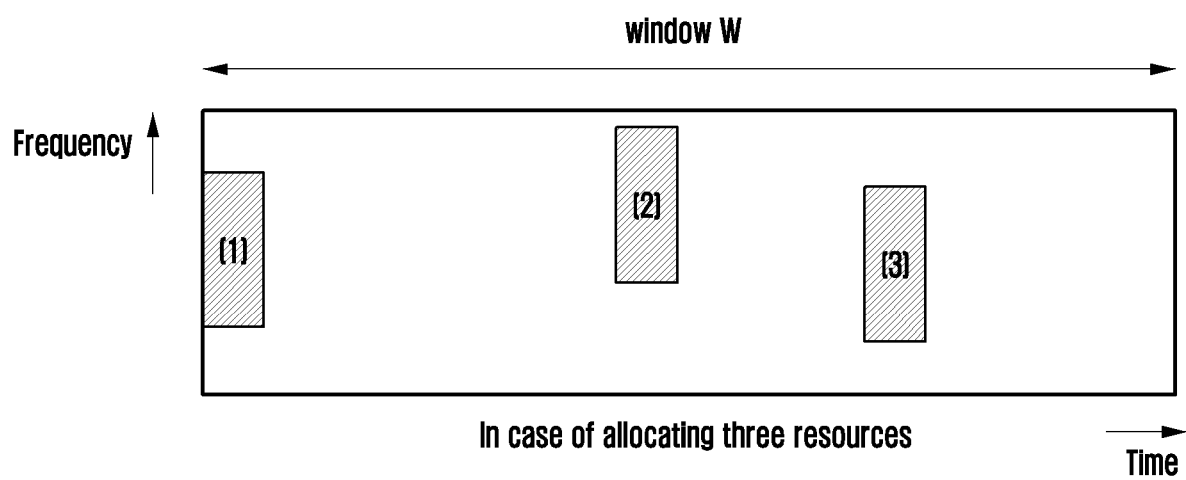

FIGS. 9A, 9B, and 9C are diagrams illustrating one, two, or three frequency-time resources are assigned and indicated according to various embodiments of the disclosure.

Referring to FIGS. 9A, 9B, and 9C, one or more of the following methods may be combined and applied in order to allocate frequency-time resources. In the following, a method of separately indicating frequency resources and time resources has been specifically discussed. In the following, a case where W=32, that is, a case having a time resource selection range of 32 slots has been discussed as an example. Further, when W is changed and applied, the size of the resource assignment bitfield required in SCI may be changed and applied.

Time resource assignment method 1: This method provides an example when Nmax=2 is configured. A 5-bit bitfield is used for time resource assignment, and when the value indicated by the 5-bit is T, the first resource is a resource assigned in the slot (slot n) in which SCI is transmitted, and the second resource is a resource assigned in n+T. In this method, T may be a value obtained by converting the 5-bit indication value into a decimal number. If the value indicated by the 5 bits is 0, that is, T=0, the second resource may be regarded as not allocated. If T=0, the second frequency resource information indicated in the same SCI may be ignored. Alternatively, if T=0, the second frequency resource information indicated in the same SCI may be a value used for another purpose.

Time resource assignment method 2: This method provides an example when Nmax=3 is configured. Two 5-bit bitfields are used for time resource assignment, and when the values indicated by each of the five bits of each bitfield are T1 and T2, the first resource is assigned in the slot (slot n) in which SCI is transmitted. The second resource is a resource assigned from n+T1, and the third resource is a resource assigned from n+T2. In the above, the order of the second and third resources may be changed according to the values of T1 and T2. In this method, T1 and T2 may be values obtained by converting values indicated in the 5-bit bitfields into decimal numbers. If a value indicated by 5 bits among the above bitfields is 0, that is, T1=0 or T2=0, the second resource or the third resource may be regarded as not allocated. In addition, if T1=0 and T2=0, the second resource and the third resource may be regarded as unallocated, and in this case, the TB may be transmitted only in a slot in which SCI is transmitted. If T1=0 or T2=0, second or third frequency resource information indicated in the same SCI may be ignored. In this method, if only two resources are to be allocated, forcing T2=0 and T1 to indicate the second resource can be applied. In this case, the time position of the first resource will be T0=0. On the contrary, in this method, if only two resources are to be allocated, forcing T1=0 and T2 to indicate the second resource may be applied. In this case, the time position of the first resource will be T0=0.

Time resource assignment method 3: This method provides an example when Nmax=3 is configured. One bitfield is used for time resource assignment, and T1 and T2 can be interpreted by the bitfield value. When the bitfield value is r, r may be determined by Equation 1 below.

$$r = \sum_{i=0}^{N-2} \binom{W-1}{i} + \sum_{i=0}^{N-2} \left\{ \begin{array}{c} W-1-T_{i+1} \\ N-1-i \end{array} \right\} \qquad \text{Equation 1}$$

In Equation 1, N is the number of resources assigned by SCI, and may be N=0 or N=1 or N=2. In the above, W is a time range in which a resource can be selected as described above. In Equation 1, Ti refers to a time slot of the $i^{th}$ resource, and in the disclosure, T0 refers to T0=0 as the first resource, and T1 and T2 indicate time slot information of the second and third resources, respectively, and may be a slot offset from the first resource.

In Equation 1, $$\left\{ \begin{array}{c} x \\ y \end{array} \right\}$$

is an extended binomial operation defined by $$\left\{ \begin{array}{c} x \\ y \end{array} \right\} = \begin{cases} \binom{x}{y} & x \geq y \\ 0 & x < y \end{cases}, \text{ and } \binom{x}{y}$$

may represent the number of cases in which y is subtracted from x, and may be a binary coefficient. According to Equation 1, the value of r may be determined within the range of Equation 2 below.

$$\left\{ 0, 1, \ldots, \sum_{i=0}^{N_{max}-1} \binom{W-1}{i} - 1 \right\} \qquad \text{Equation 2}$$

Accordingly, compared to the time resource assignment method 2, the number of bits for indicating T1 and T2 can be saved, and the size of a bitfield applied in this method may be determined as $$\left\lceil \log_2 \left( \sum_{i=0}^{N_{max}-1} \binom{W}{i} \right) \right\rceil$$

bits. In the above, ⌈x⌉ may be a value rounded up from x, or may indicate a minimum integer greater than or equal to x.

As an example, consider the case where W=32 and Nmax=3. In this case, $$\left\lceil \log_2 \left( \sum_{i=0}^{2} \binom{31}{i} \right) \right\rceil = 9$$

bits are needed to apply this method. When only one frequency-time resource is allocated, that is, when N=1, Equation 1 may be applied to Equation 3.

$$r=0 \qquad \text{Equation 3}$$

For example, T0=0, and T1 and T2 are not set to be negligible.

When only two frequency-time resources are allocated, that is, when N=2, Equation 3 can be applied to Equation 4.

$$r = 1 + \binom{31 - T_1}{1} \qquad \text{Equation 4}$$

For example, assuming T0=0, r is determined as shown in Table 1 below according to the value of T1, and the value of T2 is not determined so as to be negligible.

TABLE 1

| T1 | 1  | 2  | 3  | 4  | 5  | 6  | 7  | 8  | 9  | 10 | 11 | 12 | 13 | 14 | 15 | 16 | 17 |
|----|----|----|----|----|----|----|----|----|----|----|----|----|----|----|----|----|----|
| r  | 31 | 30 | 29 | 28 | 27 | 26 | 25 | 24 | 23 | 22 | 21 | 20 | 19 | 18 | 17 | 16 | 15 |
| T1 | 18 | 19 | 20 | 21 | 22 | 23 | 24 | 25 | 26 | 27 | 28 | 29 | 30 | 31 |    |    |    |
| r  | 14 | 13 | 12 | 11 | 10 | 9  | 8  | 7  | 6  | 5  | 4  | 3  | 2  | 1  |    |    |    |

When three frequency-time resources are allocated, that is, when N=3, Equation 1 can be applied to Equation 5.

$$r = \sum_{i=0}^{1}\binom{31}{i} + \sum_{i=0}^{1}\binom{31-T_{i+1}}{2-i} = 32 + \binom{31-T_1}{2} + \binom{31-T_2}{1} \quad \text{Equation 5}$$

For example, assuming T0=0, r is determined as shown in Table 2 below according to the values of T1 and T2.

TABLE 2

| code-point r | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| | | | | | | | | T1 | | | | | | | | | | |
| T2 | 2 | 496 | X | X | X | X | X | X | X | X | X | X | X | X | X | X | X | X |
| | 3 | 495 | 466 | X | X | X | X | X | X | X | X | X | X | X | X | X | X | X |
| | 4 | 494 | 465 | 437 | X | X | X | X | X | X | X | X | X | X | X | X | X | X |
| | 5 | 493 | 464 | 436 | 409 | X | X | X | X | X | X | X | X | X | X | X | X | X |
| | 6 | 492 | 463 | 435 | 408 | 382 | X | X | X | X | X | X | X | X | X | X | X | X |
| | 7 | 491 | 462 | 434 | 407 | 381 | 356 | X | X | X | X | X | X | X | X | X | X | X |
| | 8 | 490 | 461 | 433 | 406 | 380 | 355 | 331 | X | X | X | X | X | X | X | X | X | X |
| | 9 | 489 | 460 | 432 | 405 | 379 | 354 | 330 | 307 | X | X | X | X | X | X | X | X | X |
| | 10 | 488 | 459 | 431 | 404 | 378 | 353 | 329 | 306 | 284 | X | X | X | X | X | X | X | X |
| | 11 | 487 | 458 | 430 | 403 | 377 | 352 | 328 | 305 | 283 | 262 | X | X | X | X | X | X | X |
| | 12 | 486 | 457 | 429 | 402 | 376 | 351 | 327 | 304 | 282 | 261 | 241 | X | X | X | X | X | X |
| | 13 | 485 | 456 | 428 | 401 | 375 | 350 | 326 | 303 | 281 | 260 | 240 | 221 | X | X | X | X | X |
| | 14 | 484 | 455 | 427 | 400 | 374 | 349 | 325 | 302 | 280 | 259 | 239 | 220 | 202 | X | X | X | X |
| | 15 | 483 | 454 | 426 | 399 | 373 | 348 | 324 | 301 | 279 | 258 | 238 | 219 | 201 | 184 | X | X | X |
| | 16 | 482 | 453 | 425 | 398 | 372 | 347 | 323 | 300 | 278 | 257 | 237 | 218 | 200 | 183 | 167 | X | X |
| | 17 | 481 | 452 | 424 | 397 | 371 | 346 | 322 | 299 | 277 | 256 | 236 | 217 | 199 | 182 | 166 | 151 | X |
| | 18 | 480 | 451 | 423 | 396 | 370 | 345 | 321 | 298 | 276 | 255 | 235 | 216 | 198 | 181 | 165 | 150 | 136 |
| | 19 | 479 | 450 | 422 | 395 | 369 | 344 | 320 | 297 | 275 | 254 | 234 | 215 | 197 | 180 | 164 | 149 | 135 |
| | 20 | 478 | 449 | 421 | 394 | 368 | 343 | 319 | 296 | 274 | 253 | 233 | 214 | 196 | 179 | 163 | 148 | 134 |
| | 21 | 477 | 448 | 420 | 393 | 367 | 342 | 318 | 295 | 273 | 252 | 232 | 213 | 195 | 178 | 162 | 147 | 133 |
| | 22 | 476 | 447 | 419 | 392 | 366 | 341 | 317 | 294 | 272 | 251 | 231 | 212 | 194 | 177 | 161 | 146 | 132 |
| | 23 | 475 | 446 | 418 | 391 | 365 | 340 | 316 | 293 | 271 | 250 | 230 | 211 | 193 | 176 | 160 | 145 | 131 |
| | 24 | 474 | 445 | 417 | 390 | 364 | 339 | 315 | 292 | 270 | 249 | 229 | 210 | 192 | 175 | 159 | 144 | 130 |
| | 25 | 473 | 444 | 416 | 389 | 363 | 338 | 314 | 291 | 269 | 248 | 228 | 209 | 191 | 174 | 158 | 143 | 129 |
| | 26 | 472 | 443 | 415 | 388 | 362 | 337 | 313 | 290 | 268 | 247 | 227 | 208 | 190 | 173 | 157 | 142 | 128 |
| | 27 | 471 | 442 | 414 | 387 | 361 | 336 | 312 | 289 | 267 | 246 | 226 | 207 | 189 | 172 | 156 | 141 | 127 |
| | 28 | 470 | 441 | 413 | 386 | 360 | 335 | 311 | 288 | 266 | 245 | 225 | 206 | 188 | 171 | 155 | 140 | 126 |
| | 29 | 469 | 440 | 412 | 385 | 359 | 334 | 310 | 287 | 265 | 244 | 224 | 205 | 187 | 170 | 154 | 139 | 125 |
| | 30 | 468 | 439 | 411 | 384 | 358 | 333 | 309 | 286 | 264 | 243 | 223 | 204 | 186 | 169 | 153 | 138 | 124 |
| | 31 | 467 | 438 | 410 | 383 | 357 | 332 | 308 | 285 | 263 | 242 | 222 | 203 | 185 | 168 | 152 | 137 | 123 |

| code-point r | | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| | | | | | | | | T1 | | | | | | | |
| T2 | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |
| | 16 | X | X | X | X | X | X | X | X | X | X | X | X | X | X |
| | 17 | X | X | X | X | X | X | X | X | X | X | X | X | X | X |
| | 18 | X | X | X | X | X | X | X | X | X | X | X | X | X | X |
| | 19 | 122 | X | X | X | X | X | X | X | X | X | X | X | X | X |
| | 20 | 121 | 109 | X | X | X | X | X | X | X | X | X | X | X | X |
| | 21 | 120 | 108 | 97 | X | X | X | X | X | X | X | X | X | X | X |
| | 22 | 119 | 107 | 96 | 86 | X | X | X | X | X | X | X | X | X | X |
| | 23 | 118 | 106 | 95 | 85 | 76 | X | X | X | X | X | X | X | X | X |
| | 24 | 117 | 105 | 94 | 84 | 75 | 67 | X | X | X | X | X | X | X | X |
| | 25 | 116 | 104 | 93 | 83 | 74 | 66 | 59 | X | X | X | X | X | X | X |
| | 26 | 115 | 103 | 92 | 82 | 73 | 65 | 58 | 52 | X | X | X | X | X | X |

TABLE 2-continued

| | | | | | | | | | | | | | | |
|---|---|---|---|---|---|---|---|---|---|---|---|---|---|---|
| 27 | 114 | 102 | 91 | 81 | 72 | 64 | 57 | 51 | 46 | X | X | X | X | X |
| 28 | 113 | 101 | 90 | 80 | 71 | 63 | 56 | 50 | 45 | 41 | X | X | X | X |
| 29 | 112 | 100 | 89 | 79 | 70 | 62 | 55 | 49 | 44 | 40 | 37 | X | X | X |
| 30 | 111 | 99 | 88 | 78 | 69 | 61 | 54 | 48 | 43 | 39 | 36 | 34 | X | X |
| 31 | 110 | 98 | 87 | 77 | 68 | 60 | 53 | 47 | 42 | 38 | 35 | 33 | 32 | X |

For example, given r, information on T1 and T2 can be found.

Time resource assignment method 4: This method provides an example when Nmax=3 is configured. One bitfield is used for time resource assignment, and T1 and T2 may be interpreted by the bitfield value. When the bitfield value is r, r may be determined by the following method. In this case, N may be one of values 1 to 3, and when N is 1, r may have a specific value. As an example, r may be determined to be 0. In this case, the time resource assignment may indicate that only the first resource indicating T0=0 is allocated. As another embodiment of the disclosure, when N is 1, only the first resource is allocated, and both T1 and T2 may have a value of 0. In this case, even when N is 1, Equation 6 may be used.

When N is greater than 1, r may be determined by Equation 6 below.

if $T_2 \leq \lfloor W/2 \rfloor$ then $r = W \times T_2 + T_1$ else $r = W(W - T_2) + (W - T_1) + 1$  Equation 6

In Equation 6, N is the number of resources assigned by the SCI, and may be N=2 or N=3. In the above, W may be a value related to a time range in which a resource may be selected as described above. For example, W may be the number of a time range in which a resource can be selected, a value less by 1, or a value greater by may be a value that is rounded down from x, or may indicate a maximum integer less than or equal to x. In the above, T1 and T2 indicate time slot information of the second and third resources, respectively, and may be slot offsets from the first resource or the second resource. For example, T1 is a time offset from the first resource, and T2 is a time offset from the second resource. In this case, T0 may mean T0=0 as the first resource. T1 may have a value greater than or equal to 1, and T2 may have a value greater than or equal to 0. When T2 is 0, it may indicate that the third resource is not allocated. In other words, when N=2, T2 may have a value of 0, and when N=3, both T1 and T2 may be integers greater than 0 In other words, when N=3, both T1 and T2 may be integers greater than or equal to 1. The size of the bitfield applied in this method may be determined by $$\left\lceil \log_2 \left( \sum_{i=0}^{N_{max}-1} \binom{W}{i} \right) \right\rceil \text{ bits.}$$

In the above, $\lceil x \rceil$ may be a value rounded up from x, or may indicate a minimum integer greater than or equal to x. In order to allocate resources, the transmitter may transmit the r value after allocating the resource according to the method, and the receiver may determine the assigned resource after receiving r by the method.

Time resource assignment method 5: In this method, another example is provided when Nmax=3 is configured. One bitfield is used for time resource assignment, and T1 and T2 may be interpreted by the bitfield value. When the bitfield value is r, r may be determined as T1 and T2 as shown in Table 3 below.

TABLE 3

| code-point r | | T1 | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| T2 | 0 | X | X | X | X | X | X | X | X | X | X | X | X | X | X | X | X | X | X |
| | 1 | 496 | X | X | X | X | X | X | X | X | X | X | X | X | X | X | X | X | X |
| | 2 | 495 | 495 | X | X | X | X | X | X | X | X | X | X | X | X | X | X | X | X |
| | 3 | 494 | 494 | 494 | X | X | X | X | X | X | X | X | X | X | X | X | X | X | X |
| | 4 | 493 | 493 | 493 | 493 | X | X | X | X | X | X | X | X | X | X | X | X | X | X |
| | 5 | 492 | 492 | 492 | 492 | 492 | X | X | X | X | X | X | X | X | X | X | X | X | X |
| | 6 | 491 | 491 | 491 | 491 | 491 | 491 | X | X | X | X | X | X | X | X | X | X | X | X |
| | 7 | 490 | 490 | 490 | 490 | 490 | 490 | 490 | X | X | X | X | X | X | X | X | X | X | X |
| | 8 | 489 | 489 | 489 | 489 | 489 | 489 | 489 | 489 | X | X | X | X | X | X | X | X | X | X |
| | 9 | 488 | 488 | 488 | 488 | 488 | 488 | 488 | 488 | 488 | X | X | X | X | X | X | X | X | X |
| | 10 | 487 | 487 | 487 | 487 | 487 | 487 | 487 | 487 | 487 | 487 | X | X | X | X | X | X | X | X |
| | 11 | 486 | 486 | 486 | 486 | 486 | 486 | 486 | 486 | 486 | 486 | 486 | X | X | X | X | X | X | X |
| | 12 | 485 | 485 | 485 | 485 | 485 | 485 | 485 | 485 | 485 | 485 | 485 | 485 | X | X | X | X | X | X |
| | 13 | 484 | 484 | 484 | 484 | 484 | 484 | 484 | 484 | 484 | 484 | 484 | 484 | 484 | X | X | X | X | X |
| | 14 | 483 | 483 | 483 | 483 | 483 | 483 | 483 | 483 | 483 | 483 | 483 | 483 | 483 | 483 | X | X | X | X |
| | 15 | 182 | 482 | 482 | 482 | 482 | 482 | 482 | 482 | 482 | 482 | 482 | 482 | 482 | 482 | 482 | X | X | X |
| | 16 | 481 | 481 | 481 | 481 | 481 | 481 | 481 | 481 | 481 | 481 | 481 | 481 | 481 | 481 | 481 | 481 | X | X |
| | 17 | 480 | 480 | 480 | 480 | 480 | 480 | 480 | 480 | 480 | 480 | 480 | 480 | 480 | 480 | 480 | 480 | 480 | X |
| | 18 | 479 | 479 | 479 | 479 | 479 | 479 | 479 | 479 | 479 | 479 | 479 | 479 | 479 | 479 | 479 | 479 | 479 | 479 |
| | 19 | 478 | 478 | 478 | 478 | 478 | 478 | 478 | 478 | 478 | 478 | 478 | 478 | 478 | 478 | 478 | 478 | 478 | 478 |
| | 20 | 477 | 477 | 477 | 477 | 477 | 477 | 477 | 477 | 477 | 477 | 477 | 477 | 477 | 477 | 477 | 477 | 477 | 477 |
| | 21 | 476 | 476 | 476 | 476 | 476 | 476 | 476 | 476 | 476 | 476 | 476 | 476 | 476 | 476 | 476 | 476 | 476 | 476 |
| | 22 | 475 | 475 | 475 | 475 | 475 | 475 | 475 | 475 | 475 | 475 | 475 | 475 | 475 | 475 | 475 | 475 | 475 | 475 |
| | 23 | 474 | 474 | 474 | 474 | 474 | 474 | 474 | 474 | 474 | 474 | 474 | 474 | 474 | 474 | 474 | 474 | 474 | 474 |

TABLE 3-continued

| 24 | 473 | 473 | 473 | 473 | 473 | 473 | 473 | 473 | 473 | 473 | 473 | 473 | 473 | 473 | 473 | 473 | 473 | 473 |
| 25 | 472 | 472 | 472 | 472 | 472 | 472 | 472 | 472 | 472 | 472 | 472 | 472 | 472 | 472 | 472 | 472 | 472 | 472 |
| 26 | 471 | 471 | 471 | 471 | 471 | 471 | 471 | 471 | 471 | 471 | 471 | 471 | 471 | 471 | 471 | 471 | 471 | 471 |
| 27 | 470 | 470 | 470 | 470 | 470 | 470 | 470 | 470 | 470 | 470 | 470 | 470 | 470 | 470 | 470 | 470 | 470 | 470 |
| 28 | 469 | 469 | 469 | 469 | 469 | 469 | 469 | 469 | 469 | 469 | 469 | 469 | 469 | 469 | 469 | 469 | 469 | 469 |
| 29 | 468 | 468 | 468 | 468 | 468 | 468 | 468 | 468 | 468 | 468 | 468 | 468 | 468 | 468 | 468 | 468 | 468 | 468 |
| 30 | 467 | 467 | 467 | 467 | 467 | 467 | 467 | 467 | 467 | 467 | 467 | 467 | 467 | 467 | 467 | 467 | 467 | 467 |
| 31 | 466 | 466 | 466 | 466 | 466 | 466 | 466 | 466 | 466 | 466 | 466 | 466 | 466 | 466 | 466 | 466 | 466 | 466 |

| | code-point r | | T1 | | | | | | | | | | | | |
|---|---|---|---|---|---|---|---|---|---|---|---|---|---|---|---|
| | | | 18 | 19 | 20 | 21 | 22 | 23 | 24 | 25 | 26 | 27 | 28 | 29 | 30 | 31 |
| T2 | 0 | | X | X | X | X | X | X | X | X | X | X | X | X | X | X |
| | 1 | | X | X | X | X | X | X | X | X | X | X | X | X | X | X |
| | 2 | | X | X | X | X | X | X | X | X | X | X | X | X | X | X |
| | 3 | | X | X | X | X | X | X | X | X | X | X | X | X | X | X |
| | 4 | | X | X | X | X | X | X | X | X | X | X | X | X | X | X |
| | 5 | | X | X | X | X | X | X | X | X | X | X | X | X | X | X |
| | 6 | | X | X | X | X | X | X | X | X | X | X | X | X | X | X |
| | 7 | | X | X | X | X | X | X | X | X | X | X | X | X | X | X |
| | 8 | | X | X | X | X | X | X | X | X | X | X | X | X | X | X |
| | 9 | | X | X | X | X | X | X | X | X | X | X | X | X | X | X |
| | 10 | | X | X | X | X | X | X | X | X | X | X | X | X | X | X |
| | 11 | | X | X | X | X | X | X | X | X | X | X | X | X | X | X |
| | 12 | | X | X | X | X | X | X | X | X | X | X | X | X | X | X |
| | 13 | | X | X | X | X | X | X | X | X | X | X | X | X | X | X |
| | 14 | | X | X | X | X | X | X | X | X | X | X | X | X | X | X |
| | 15 | | X | X | X | X | X | X | X | X | X | X | X | X | X | X |
| | 16 | | X | X | X | X | X | X | X | X | X | X | X | X | X | X |
| | 17 | | X | X | X | X | X | X | X | X | X | X | X | X | X | X |
| | 18 | | X | X | X | X | X | X | X | X | X | X | X | X | X | X |
| | 19 | | 478 | X | X | X | X | X | X | X | X | X | X | X | X | X |
| | 20 | | 477 | 477 | X | X | X | X | X | X | X | X | X | X | X | X |
| | 21 | | 476 | 476 | 476 | X | X | X | X | X | X | X | X | X | X | X |
| | 22 | | 475 | 475 | 475 | 475 | X | X | X | X | X | X | X | X | X | X |
| | 23 | | 474 | 474 | 474 | 474 | 474 | X | X | X | X | X | X | X | X | X |
| | 24 | | 473 | 473 | 473 | 473 | 473 | 473 | X | X | X | X | X | X | X | X |
| | 25 | | 472 | 472 | 472 | 472 | 472 | 472 | 472 | X | X | X | X | X | X | X |
| | 26 | | 471 | 471 | 471 | 471 | 471 | 471 | 471 | 471 | X | X | X | X | X | X |
| | 27 | | 470 | 470 | 470 | 470 | 470 | 470 | 470 | 470 | 470 | X | X | X | X | X |
| | 28 | | 469 | 469 | 469 | 469 | 469 | 469 | 469 | 469 | 469 | 469 | X | X | X | X |
| | 29 | | 468 | 468 | 468 | 468 | 468 | 468 | 468 | 468 | 468 | 468 | 468 | X | X | X |
| | 30 | | 467 | 467 | 467 | 467 | 467 | 467 | 467 | 467 | 467 | 467 | 467 | 467 | X | X |
| | 31 | | 466 | 466 | 466 | 466 | 466 | 466 | 466 | 466 | 466 | 466 | 466 | 466 | 1 | X |

In the above Table 3, T1 refers to the time slot of the i-th resource, and in the disclosure, T0 refers to T0=0 as the first resource, when T1>0, T1 and T2 refer to the time slot information of the second and third resource, respectively, and when T1=0, T2 refers to the time slot information of the second resource, and is a slot offset from the first resource.

As an example, consider the case where W=32 and Nmax=3. In this case, $$\left\lceil \log_2\left(\sum_{i=0}^{2} \binom{31}{i}\right) \right\rceil = 9$$

bits are needed to apply this method.

Second Embodiment

The second embodiment provides another method and apparatus for allocating a frequency-time resource to a receiving terminal in a process in which a terminal performs detection and resource selection and transmits data in a sidelink.

The information for allocating up to Nmax frequency-time resources may be transmitted by a transmitting terminal to a receiving terminal in sidelink control information. The Nmax may be a configured value, and for example, may be set to 2 or 3. For example, when Nmax is configured as 3, up to 3 pieces of resource assignment information may be delivered in SCI. Of course, when Nmax is configured as 3, only one piece of resource assignment information may be delivered, or only two pieces of resource assignment information may be delivered, or three pieces of resource assignment information may be delivered. The range of frequency-time resources that can be assigned in the above may be given by W. For example, the time range of the assigned resources that can be indicated by the SCI may be W. W may be given as the number of slots. For example, W may be given as 32, which means that Nmax pieces of resource assignment information can be transmitted within 32 slots in SCI.

Figure 10:
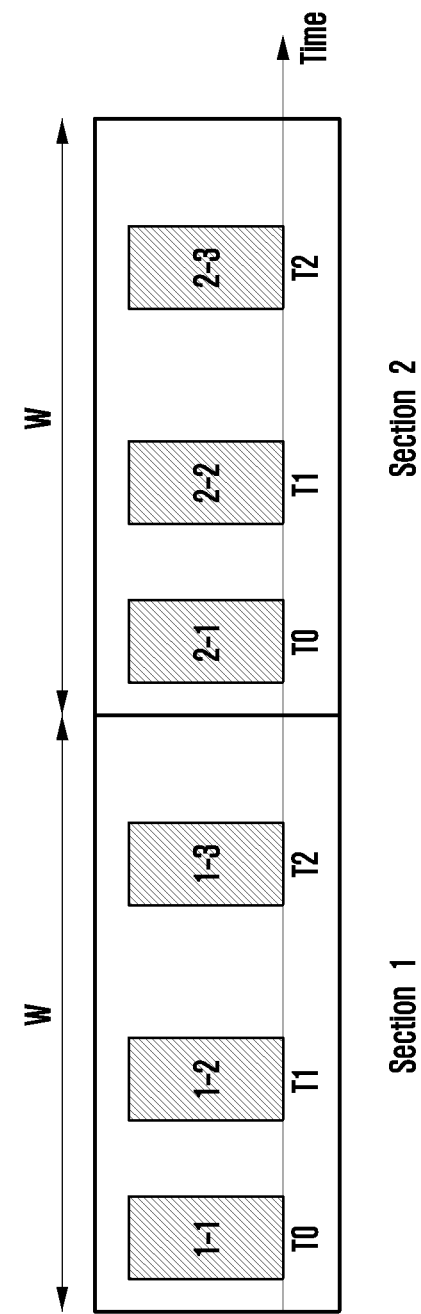
FIG. 10 is a diagram illustrating a process of detecting sidelink control information (SCI) related to an embodiment of the disclosure.

FIG. 10 is a diagram illustrating a process of detecting SCI related to an embodiment of the disclosure.

Referring to FIG. 10, in the above, a transmitting terminal allocates Nmax resources, but this is a resource for PSSCH transmission within one period, and after that, the transmitting terminal indicates a predetermined period, so that the location information of Nmax resources in the next period can be transmitted to a receiving terminal. For example, when three pieces of resource assignment information is transmitted in section 1 to the receiving terminal in FIG. 10, it may indicate three pieces of resource assignment information in section 2 corresponding to the next period. In this embodiment of the disclosure, a method of transmitting information of T0, or T0, and T1, or T0, T1, T2 is provided. In this case, T0, T1, and T2 may each be assigned as a position of a slot in which the PSSCH is transmitted or an offset value from the slot of T0 according to the order of transmission within a period. T0 is a slot in which the first transmission in a section is performed, and if T0, T1, and T2 are defined as offsets according to a relative distance from T0, T0=0 may be determined. For example, if the receiving terminal receives the SCI at the location T0, T1, or T2 and analyzes the time resource assignment information, the absolute slot index of T0, T1, T2 can be calculated from the slot in which the corresponding SCI is detected. For the calculation, it is necessary to find out which assignment resources the SCI and PSSCH transmitted in the corresponding interval are. For example, when the receiving terminal detects SCI in the T1 slot in section 1 in FIG. 10, an indicator that allows it to know that the corresponding transmission corresponds to 1-2 (that is, the second transmission in section 1) rather than 1-1 or 1-3 should be known in the SCI.

These indicators or information may be indicated by 1 bit when Nmax=2 is (pre-)configured, and may be indicated by 2 bits when Nmax=3 is configured. At this time, it may be indicated in the following manner.

TABLE 4

Table 4 shows the case of Nmax = 2.

| Bit field value | Interpretation method |
|---|---|
| 0 | N = 1 or N = 2, first transmission in section |
| 1 | In case of N = 2, second transmission in section |

TABLE 5

Table 5 shows the case of Nmax = 3.

| Bit field value | Interpretation method |
|---|---|
| 00 | N = 1 or N = 2 or N = 3, first transmission in section |
| 01 | In case of N = 3, second transmission in section |
| 10 | In case of N = 2, third transmission in section |
| 11 | In case of N = 2, second transmission in section |

TABLE 6

In the case of Nmax = 3 in Table 5, it may be applied and used in the same manner as in Table 6 below.

| Bit field value | Interpretation method |
|---|---|
| 00 | N = 1 or N = 2 or N = 3, first transmission in section |
| 01 | In case of N = 2 or N = 3, second transmission in section |
| 10 | In case of N = 3, third transmission in section |
| 11 | Reserved |

In Table 6, Reserved is limited to 11, but it can be applied even when other values are reserved and used.

Figure 11:
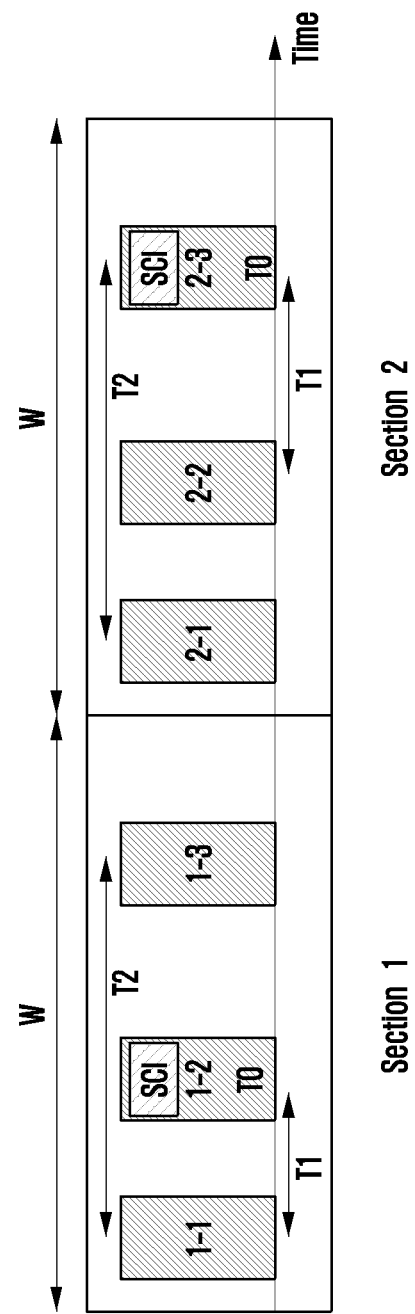
FIG. 11 is a diagram illustrating a process of detecting SCI related to an embodiment of the disclosure.

FIG. 11 is a diagram illustrating a process of detecting SCI related to an embodiment of the disclosure.

Referring to FIG. 11, a slot in which SCI is detected is set to T0, and T1 and T2 may mean a difference between a specific slot and another slot. In FIG. 11, in section 1, the SCI detection slot is a slot for the second transmission in the section. In this case, T0 may be a slot in which the second transmission is performed, based on this, the relative position of the slot in which the first transmission is performed may be T1, and the relative position of the third transmission slot based on the first transmission may be T2. In section 2, the SCI detection slot is the slot for the third transmission in the section. In this case, T0 may be a slot in which the third transmission is performed, the relative position of the slot in which the second transmission is performed, based on T0 may be T1, and the relative position of the first transmission slot, based on T0 may be T2.

FIGS. 9A, 9B, and 9C are diagrams illustrating one, two, or three frequency-time resources are assigned and indicated. One or more of the following methods may be combined and applied in order to allocate frequency-time resources. In the following, a method of separately indicating frequency resources and time resources has been specifically discussed. In the following, a case where W=32, that is, a case having a time resource selection range of 32 slots has been discussed as an example. Further, when W is changed and applied, the size of the resource assignment bitfield required in SCI may be changed and applied.

Time resource assignment method 1: This method provides an example when Nmax=2 is configured. A 5-bit bitfield is used for time resource assignment, and when the value indicated by the 5-bit is T, the first resource is a resource assigned in the slot (slot n) in which SCI is transmitted, and the second resource is a resource assigned in n+T. In this method, T may be a value obtained by converting the 5-bit indication value into a decimal number. If the value indicated by the 5 bits is 0, that is, T=0, the second resource may be regarded as not allocated. If T=0, the second frequency resource information indicated in the same SCI may be ignored. Alternatively, if T=0, the second frequency resource information indicated in the same SCI may be a value used for another purpose.

Time resource assignment method 2: This method provides an example when Nmax=3 is configured. Two 5-bit bitfields are used for time resource assignment, and when the values indicated by each of the five bits of each bitfield are T1 and T2, the first resource is assigned in the slot (slot n) in which SCI is transmitted. The second resource is a resource assigned from n+T1, and the third resource is a resource assigned from n+T2. In the above, the order of the second and third resources may be changed according to the values of T1 and T2. In this method, T1 and T2 may be values obtained by converting values indicated in the 5-bit bitfields into decimal numbers. If a value indicated by 5 bits among the above bitfields is 0, that is, T1=0 or T2=0, the second resource or the third resource may be regarded as not allocated. In addition, if T1=0 and T2=0, the second resource and the third resource may be regarded as unallocated, and in this case, the TB may be transmitted only in a slot in which SCI is transmitted. If T1=0 or T2=0, second or third frequency resource information indicated in the same SCI may be ignored. In this method, if only two resources are to be allocated, forcing T2=0 and T1 to indicate the second resource can be applied. In this case, the time position of the first resource will be T0=0. On the contrary, in this method, if only two resources are to be allocated, forcing T1=0 and T2 to indicate the second resource may be applied. In this case, the time position of the first resource will be T0=0.

Time resource assignment method 3: This method provides an example when Nmax=3 is configured. One bitfield is used for time resource assignment, and T1 and T2 can be interpreted by the bitfield value. When the bitfield value is r, r may be determined by Equation 7 below.

$$r = \sum_{i=0}^{N-2} \binom{W-1}{i} + \sum_{i=0}^{N-2} \left\{ \begin{matrix} W-1-T_{i+1} \\ N-1-i \end{matrix} \right\} \quad \text{Equation 7}$$

In Equation 7, N is the number of resources assigned by SCI, and may be N=0 or N=1 or N=2. In the above, W is a time range in which a resource can be selected as described above. In Equation 7, T1 refers to a time slot of the $i^{th}$ resource, and in the disclosure, T0 refers to T0=0 as the first resource, and T1 and T2 indicate time slot information of the second and third resources, respectively, and may be a slot offset from the first resource.

In the Equation 7, $$\left\{ \begin{matrix} x \\ y \end{matrix} \right\}$$

is an extended binomial operation defined by $$\left\{ \begin{matrix} x \\ y \end{matrix} \right\} = \begin{cases} \binom{x}{y} & x \geq y \\ 0 & x < y \end{cases}, \text{ and } \binom{x}{y}$$

may represent the number of cases in which y is subtracted from x, and may be a binomial coefficient. According to Equation 7, the r value may be determined within the range of Equation 8 below.

$$\left\{ 0, 1, \ldots, \sum_{i=0}^{N_{max}-1} \binom{W-1}{i} - 1 \right\} \quad \text{Equation 8}$$

Accordingly, compared to the time resource assignment method 2, the number of bits for indicating T1 and T2 can be saved, and the size of a bitfield applied in this method may be determined as $$\left\lceil \log_2 \left( \sum_{i=0}^{N_{max}-1} \binom{W}{i} \right) \right\rceil \text{ bits.}$$

In the above, ⌈x⌉ may be a value rounded up from x, or may indicate a minimum integer greater than or equal to x.

As an example, consider the case where W=32 and Nmax=3. In this case, $$\left\lceil \log_2 \left( \sum_{i=0}^{2} \binom{31}{i} \right) \right\rceil = 9$$

bits are needed to apply this method. When only one frequency-time resource is allocated, that is, when N=1, Equation 7 may be applied to Equation 9.

$$r = 0 \quad \text{Equation 9}$$

For example, T0=0, and T1 and T2 are not set to be negligible.

When only two frequency-time resources are allocated, that is, when N=2, Equation 9 can be applied to Equation 10.

$$r = 1 + \binom{31 - T_1}{1} \quad \text{Equation 10}$$

For example, assuming T0=0, r is determined as shown in Table 7 below according to the value of T1, and the value of T2 is not determined so as to be negligible.

TABLE 7

| T1 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| r | 31 | 30 | 29 | 28 | 27 | 26 | 25 | 24 | 23 | 22 | 21 | 20 | 19 | 18 | 17 | 16 | 15 |
| T1 | 18 | 19 | 20 | 21 | 22 | 23 | 24 | 25 | 26 | 27 | 28 | 29 | 30 | 31 | | | |
| r | 14 | 13 | 12 | 11 | 10 | 9 | 8 | 7 | 6 | 5 | 4 | 3 | 2 | 1 | | | |

When three frequency-time resources are allocated, that is, when N=3, Equation 7 can be applied to Equation 11.

$$r = \sum_{i=0}^{1} \binom{31}{i} + \sum_{i=0}^{1} \left\{ \begin{matrix} 31 - T_{i+1} \\ 2 - i \end{matrix} \right\} = \quad \text{Equation 11}$$

$$32 + \binom{31 - T_1}{2} + \binom{31 - T_2}{1}$$

For example, assuming T0=0, r is determined as shown in Table 8 below according to the values of T1 and T2.

TABLE 8

| code-point r | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| T2 | 2 | 496 | X | X | X | X | X | X | X | X | X | X | X | X | X | X | X | X |
| | 3 | 495 | 466 | X | X | X | X | X | X | X | X | X | X | X | X | X | X | X |
| | 4 | 494 | 465 | 437 | X | X | X | X | X | X | X | X | X | X | X | X | X | X |
| | 5 | 493 | 464 | 436 | 409 | X | X | X | X | X | X | X | X | X | X | X | X | X |
| | 6 | 492 | 463 | 435 | 408 | 382 | X | X | X | X | X | X | X | X | X | X | X | X |
| | 7 | 491 | 462 | 434 | 407 | 381 | 356 | X | X | X | X | X | X | X | X | X | X | X |
| | 8 | 490 | 461 | 433 | 406 | 380 | 355 | 331 | X | X | X | X | X | X | X | X | X | X |
| | 9 | 489 | 460 | 432 | 405 | 379 | 354 | 330 | 307 | X | X | X | X | X | X | X | X | X |
| | 10 | 488 | 459 | 431 | 404 | 378 | 353 | 329 | 306 | 284 | X | X | X | X | X | X | X | X |
| | 11 | 487 | 458 | 430 | 403 | 377 | 352 | 328 | 305 | 283 | 262 | X | X | X | X | X | X | X |
| | 12 | 486 | 457 | 429 | 402 | 376 | 351 | 327 | 304 | 282 | 261 | 241 | X | X | X | X | X | X |
| | 13 | 485 | 456 | 428 | 401 | 375 | 350 | 326 | 303 | 281 | 260 | 240 | 221 | X | X | X | X | X |
| | 14 | 484 | 455 | 427 | 400 | 374 | 349 | 325 | 302 | 280 | 259 | 239 | 220 | 202 | X | X | X | X |
| | 15 | 483 | 454 | 426 | 399 | 373 | 348 | 324 | 301 | 279 | 258 | 238 | 219 | 201 | 184 | X | X | X |
| | 16 | 482 | 453 | 425 | 398 | 372 | 347 | 323 | 300 | 278 | 257 | 237 | 218 | 200 | 183 | 167 | X | X |
| | 17 | 481 | 452 | 424 | 397 | 371 | 346 | 322 | 299 | 277 | 256 | 236 | 217 | 199 | 182 | 166 | 151 | X |
| | 18 | 480 | 451 | 423 | 396 | 370 | 345 | 321 | 298 | 276 | 255 | 235 | 216 | 198 | 181 | 165 | 150 | 136 |
| | 19 | 479 | 450 | 422 | 395 | 369 | 344 | 320 | 297 | 275 | 254 | 234 | 215 | 197 | 180 | 164 | 149 | 135 |
| | 20 | 478 | 449 | 421 | 394 | 368 | 343 | 319 | 296 | 274 | 253 | 233 | 214 | 196 | 179 | 163 | 148 | 134 |
| | 21 | 477 | 448 | 420 | 393 | 367 | 342 | 318 | 295 | 273 | 252 | 232 | 213 | 195 | 178 | 162 | 147 | 133 |
| | 22 | 476 | 447 | 419 | 392 | 366 | 341 | 317 | 294 | 272 | 251 | 231 | 212 | 194 | 177 | 161 | 146 | 132 |
| | 23 | 475 | 446 | 418 | 391 | 365 | 340 | 316 | 293 | 271 | 250 | 230 | 211 | 193 | 176 | 160 | 145 | 131 |
| | 24 | 474 | 445 | 417 | 390 | 364 | 339 | 315 | 292 | 270 | 249 | 229 | 210 | 192 | 175 | 159 | 144 | 130 |
| | 25 | 473 | 444 | 416 | 389 | 363 | 338 | 314 | 291 | 269 | 248 | 228 | 209 | 191 | 174 | 158 | 143 | 129 |
| | 26 | 472 | 443 | 415 | 388 | 362 | 337 | 313 | 290 | 268 | 247 | 227 | 208 | 190 | 173 | 157 | 142 | 128 |
| | 27 | 471 | 442 | 414 | 387 | 361 | 336 | 312 | 289 | 267 | 246 | 226 | 207 | 189 | 172 | 156 | 141 | 127 |
| | 28 | 470 | 441 | 413 | 386 | 360 | 335 | 311 | 288 | 266 | 245 | 225 | 206 | 188 | 171 | 155 | 140 | 126 |
| | 29 | 469 | 440 | 412 | 385 | 359 | 334 | 310 | 287 | 265 | 244 | 224 | 205 | 187 | 170 | 154 | 139 | 125 |
| | 30 | 468 | 439 | 411 | 384 | 358 | 333 | 309 | 286 | 264 | 243 | 223 | 204 | 186 | 169 | 153 | 138 | 124 |
| | 31 | 467 | 438 | 410 | 383 | 357 | 332 | 308 | 285 | 263 | 242 | 222 | 203 | 185 | 168 | 152 | 137 | 123 |

| code-point r | | T1 | | | | | | | | | | | | | |
|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 |
| T2 | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |
| | 16 | X | X | X | X | X | X | X | X | X | X | X | X | X | X |
| | 17 | X | X | X | X | X | X | X | X | X | X | X | X | X | X |
| | 18 | X | X | X | X | X | X | X | X | X | X | X | X | X | X |
| | 19 | 122 | X | X | X | X | X | X | X | X | X | X | X | X | X |
| | 20 | 121 | 109 | X | X | X | X | X | X | X | X | X | X | X | X |
| | 21 | 120 | 108 | 97 | X | X | X | X | X | X | X | X | X | X | X |
| | 22 | 119 | 107 | 96 | 86 | X | X | X | X | X | X | X | X | X | X |
| | 23 | 118 | 106 | 95 | 85 | 76 | X | X | X | X | X | X | X | X | X |
| | 24 | 117 | 105 | 94 | 84 | 75 | 67 | X | X | X | X | X | X | X | X |
| | 25 | 116 | 104 | 93 | 83 | 74 | 66 | 59 | X | X | X | X | X | X | X |
| | 26 | 115 | 103 | 92 | 82 | 73 | 65 | 58 | 52 | X | X | X | X | X | X |
| | 27 | 114 | 102 | 91 | 81 | 72 | 64 | 57 | 51 | 46 | X | X | X | X | X |
| | 28 | 113 | 101 | 90 | 80 | 71 | 63 | 56 | 50 | 45 | 41 | X | X | X | X |
| | 29 | 112 | 100 | 89 | 79 | 70 | 62 | 55 | 49 | 44 | 40 | 37 | X | X | X |
| | 30 | 111 | 99 | 88 | 78 | 69 | 61 | 54 | 48 | 43 | 39 | 36 | 34 | X | X |
| | 31 | 110 | 98 | 87 | 77 | 68 | 60 | 53 | 47 | 42 | 38 | 35 | 33 | 32 | X |

For example, if r is given, information on T1 and T2 can be found.

Time resource assignment method 4: This method provides an example when Nmax=3 is configured. One bitfield is used for time resource assignment, and T1 and T2 may be interpreted by the bitfield value. When the bitfield value is r, r may be determined by the following method. In this case, N may be one of values 1 to 3, and when N is 1, r may have a specific value. As an example, r may be determined to be 0. In this case, the time resource assignment may indicate that only the first resource indicating T0=0 is allocated. As another embodiment of the disclosure, when N is 1, only the first resource is allocated, and both T1 and T2 may have a value of 0. In this case, even when N is 1, Equation 12 may be used.

When N is greater than 1, r may be determined by Equation 12 below.

if $T_2 \leq \lfloor W/2 \rfloor$ then $r = W \times T_2 + T_1$ else $r = W(W-T_2) + (W-T_1) + 1$  Equation 12

In Equation 12, N is the number of resources assigned by the SCI, and may be N=2 or N=3. In the above, W may be a value related to a time range in which a resource may be selected as described above. For example, W may be the number of a time range in which a resource can be selected, a value less by 1, or a value greater by 1 . . . $\lfloor x \rfloor$ may be a value that is rounded down from x, or may indicate a maximum integer less than or equal to x. In the above, T1 and T2 indicate time slot information of the second and third resources, respectively, and may be slot offsets from the first resource or the second resource. For example, T1 is a time offset from the first resource, and T2 is a time offset from the second resource. In this case, T0 may mean T0=0 as the first resource. T1 may have a value greater than or equal to 1, and T2 may have a value greater than or equal to 0. When T2 is 0, it may indicate that the third resource is not allocated. In other words, when N=2, T2 may have a value of 0, and when N=3, both T1 and T2 may be integers greater than 0 In other words, when N=3, both T1 and T2 may be integers greater than or equal to 1. The size of the bitfield applied in this method may be determined by $$\left\lceil \log_2 \left( \sum_{i=0}^{N_{max}-1} \binom{W}{i} \right) \right\rceil \text{ bits.}$$

In the above, $\lceil x \rceil$ may be a value rounded up from x, or may indicate a minimum integer greater than or equal to x. In order to allocate resources, the transmitter may transmit the r value after allocating the resource according to the method, and the receiver may determine the assigned resource after receiving r by the method.

Time resource assignment method 5: In this method, another example is provided when Nmax=3 is configured. One bitfield is used for time resource assignment, and T1 and T2 may be interpreted by the bitfield value.

As an example, consider the case where W=32 and Nmax=3. In this case, $$\left\lceil \log_2 \left( \sum_{i=0}^{2} \binom{31}{i} \right) \right\rceil = 9$$

bits are required to apply this method.

As another example, it can be expressed using the distance between time resources. For example, again, when Nmax=2 is set, the following method can be used.

Method A1: The first resource in the section is T0, the relative position offset from T0 to the second resource may be defined as T1, and the r value, which is the resource assignment bitfield value (codepoint), may be defined as T1-T0. If r=0, only one resource within the interval may be allocated. For example, in this case, N=1.

Method A2: The location of the slot where the SCI is detected may be T0, and the location of other resources within the section may be T1. In this case, the r value, which is the resource assignment bitfield value (codepoint), may be defined as the difference between slot T1 and slot T0. Alternatively, the r value may be 1 T1-T01. For example, the r value is the absolute value of |T1-T0|.

When Nmax=3 is configured in the resource pool, the following method can be used.

Method B1: When N=1, r=0 can be. In the case of N=2, the value of r may be mapped and used between 1 and 31 as in Method A1 or A2. Alternatively, when N=1 or N=2, the above method A1 or A2 may be used. In the case of N=3, r may be calculated in the following manner. The offset value, which is the difference between the first resource slot in the interval and the second resource slot, may be defined as T1, the offset value, which is the difference between the slot of the first resource and the slot of the third resource, may be defined as T2, and the r value may be calculated as follows.

If $T2 \leq \lceil W/2 \rceil$ then $r = (W-1) \times (T1-1) + T2 + 1$ else $r = (W-1) \times (W-T1) + W-T2 + 1$ The equation for obtaining r in the above may be modified and applied. In the case of W=32, the r value according to T1 and T2 from the above equation may be calculated as shown in Table 9 below.

TABLE 9

| code-point r | | | | | | | T1 | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| T2 1 | X | X | X | X | X | X | X | X | X | X | X | X | X | X | X | X | X |
| 2 | 33 | X | X | X | X | X | X | X | X | X | X | X | X | X | X | X | X |
| 3 | 64 | 65 | X | X | X | X | X | X | X | X | X | X | X | X | X | X | X |
| 4 | 95 | 96 | 97 | X | X | X | X | X | X | X | X | X | X | X | X | X | X |
| 5 | 126 | 127 | 128 | 129 | X | X | X | X | X | X | X | X | X | X | X | X | X |
| 6 | 157 | 158 | 159 | 160 | 161 | X | X | X | X | X | X | X | X | X | X | X | X |
| 7 | 188 | 189 | 190 | 191 | 192 | 193 | X | X | X | X | X | X | X | X | X | X | X |
| 8 | 219 | 220 | 221 | 222 | 223 | 224 | 225 | X | X | X | X | X | X | X | X | X | X |
| 9 | 250 | 251 | 252 | 253 | 254 | 255 | 256 | 257 | X | X | X | X | X | X | X | X | X |
| 10 | 281 | 282 | 283 | 284 | 285 | 286 | 287 | 288 | 289 | X | X | X | X | X | X | X | X |
| 11 | 312 | 313 | 314 | 315 | 316 | 317 | 318 | 319 | 320 | 321 | X | X | X | X | X | X | X |
| 12 | 343 | 344 | 345 | 346 | 347 | 348 | 349 | 350 | 351 | 352 | 353 | X | X | X | X | X | X |

TABLE 9-continued

| | | | | | | | | | | | | | | | | | |
|---|---|---|---|---|---|---|---|---|---|---|---|---|---|---|---|---|---|
| 13 | 374 | 375 | 376 | 377 | 378 | 379 | 380 | 331 | 382 | 383 | 384 | 385 | X | X | X | X | X |
| 14 | 405 | 406 | 407 | 408 | 409 | 410 | 411 | 412 | 413 | 414 | 415 | 416 | 417 | X | X | X | X |
| 15 | 436 | 437 | 438 | 439 | 440 | 441 | 442 | 443 | 444 | 445 | 446 | 447 | 448 | 449 | X | X | X |
| 16 | 467 | 468 | 469 | 470 | 471 | 472 | 473 | 474 | 475 | 476 | 477 | 478 | 479 | 480 | 481 | X | X |
| 17 | 497 | 496 | 495 | 494 | 493 | 492 | 491 | 490 | 489 | 488 | 487 | 486 | 485 | 484 | 483 | 482 | X |
| 18 | 466 | 465 | 464 | 463 | 462 | 461 | 460 | 459 | 458 | 457 | 456 | 455 | 454 | 453 | 452 | 451 | 450 |
| 19 | 435 | 434 | 433 | 432 | 431 | 430 | 429 | 428 | 427 | 426 | 425 | 424 | 423 | 422 | 421 | 420 | 419 |
| 20 | 404 | 403 | 402 | 401 | 400 | 399 | 398 | 397 | 396 | 395 | 394 | 393 | 392 | 391 | 390 | 389 | 388 |
| 21 | 373 | 372 | 371 | 370 | 369 | 368 | 367 | 366 | 365 | 364 | 363 | 362 | 361 | 360 | 359 | 358 | 357 |
| 22 | 342 | 341 | 340 | 339 | 338 | 337 | 336 | 335 | 334 | 333 | 332 | 331 | 330 | 329 | 328 | 327 | 326 |
| 23 | 311 | 310 | 309 | 308 | 307 | 306 | 305 | 304 | 303 | 302 | 301 | 300 | 299 | 298 | 297 | 296 | 295 |
| 24 | 280 | 279 | 278 | 277 | 276 | 275 | 274 | 273 | 272 | 271 | 270 | 269 | 268 | 267 | 266 | 265 | 264 |
| 25 | 249 | 248 | 247 | 246 | 245 | 244 | 243 | 242 | 241 | 240 | 239 | 238 | 237 | 236 | 235 | 234 | 233 |
| 26 | 218 | 217 | 216 | 215 | 214 | 213 | 212 | 211 | 210 | 209 | 208 | 207 | 206 | 205 | 204 | 203 | 202 |
| 27 | 187 | 186 | 185 | 184 | 183 | 182 | 181 | 180 | 179 | 178 | 177 | 176 | 175 | 174 | 173 | 172 | 171 |
| 28 | 156 | 155 | 154 | 153 | 152 | 151 | 150 | 149 | 148 | 147 | 146 | 145 | 144 | 143 | 142 | 141 | 140 |
| 29 | 125 | 124 | 123 | 122 | 121 | 120 | 119 | 118 | 117 | 116 | 115 | 114 | 113 | 112 | 111 | 110 | 109 |
| 30 | 94 | 93 | 92 | 91 | 90 | 89 | 88 | 87 | 86 | 85 | 34 | 83 | 32 | 81 | 80 | 79 | 78 |
| 31 | 63 | 62 | 61 | 60 | 59 | 58 | 57 | 56 | 55 | 54 | 53 | 52 | 51 | 50 | 49 | 48 | 47 |

| code-point r | | T1 | | | | | | | | | | | | | |
|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 |
| T2 | 1 | X | X | X | X | X | X | X | X | X | X | X | X | X | X |
| | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |
| | 16 | X | X | X | X | X | X | X | X | X | X | X | X | X | X |
| | 17 | X | X | X | X | X | X | X | X | X | X | X | X | X | X |
| | 18 | X | X | X | X | X | X | X | X | X | X | X | X | X | X |
| | 19 | 418 | X | X | X | X | X | X | X | X | X | X | X | X | X |
| | 20 | 387 | 386 | X | X | X | X | X | X | X | X | X | X | X | X |
| | 21 | 356 | 355 | 354 | X | X | X | X | X | X | X | X | X | X | X |
| | 22 | 325 | 324 | 323 | 322 | X | X | X | X | X | X | X | X | X | X |
| | 23 | 294 | 293 | 292 | 291 | 290 | X | X | X | X | X | X | X | X | X |
| | 24 | 263 | 262 | 261 | 260 | 259 | 258 | X | X | X | X | X | X | X | X |
| | 25 | 232 | 231 | 230 | 229 | 228 | 227 | 226 | X | X | X | X | X | X | X |
| | 26 | 201 | 200 | 199 | 198 | 197 | 196 | 195 | 194 | X | X | X | X | X | X |
| | 27 | 170 | 169 | 168 | 167 | 166 | 165 | 164 | 163 | 162 | X | X | X | X | X |
| | 28 | 139 | 138 | 137 | 136 | 135 | 134 | 133 | 132 | 131 | 130 | X | X | X | X |
| | 29 | 108 | 107 | 106 | 105 | 134 | 103 | 102 | 101 | 100 | 99 | 98 | X | X | X |
| | 30 | 77 | 76 | 75 | 74 | 73 | 72 | 71 | 70 | 69 | 68 | 67 | 66 | X | X |
| | 31 | 46 | 45 | 44 | 43 | 42 | 41 | 40 | 39 | 38 | 37 | 36 | 35 | 34 | X |

In the case of W=31, the value of r may be calculated as shown in Table 10 below.

TABLE 10

| code-point r | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| T2 | 1 | X | X | X | X | X | X | X | X | X | X | X | X | X | X | X | X | X |
| | 2 | 32 | X | X | X | X | X | X | X | X | X | X | X | X | X | X | X | X |
| | 3 | 62 | 63 | X | X | X | X | X | X | X | X | X | X | X | X | X | X | X |
| | 4 | 92 | 93 | 94 | X | X | X | X | X | X | X | X | X | X | X | X | X | X |
| | 5 | 122 | 123 | 124 | 125 | X | X | X | X | X | X | X | X | X | X | X | X | X |
| | 6 | 152 | 153 | 154 | 155 | 156 | X | X | X | X | X | X | X | X | X | X | X | X |
| | 7 | 182 | 183 | 184 | 185 | 186 | 187 | X | X | X | X | X | X | X | X | X | X | X |
| | 8 | 212 | 213 | 214 | 215 | 216 | 217 | 218 | X | X | X | X | X | X | X | X | X | X |
| | 9 | 242 | 243 | 244 | 245 | 246 | 247 | 248 | 249 | X | X | X | X | X | X | X | X | X |
| | 10 | 272 | 273 | 274 | 275 | 276 | 277 | 278 | 279 | 280 | X | X | X | X | X | X | X | X |
| | 11 | 302 | 303 | 304 | 305 | 306 | 307 | 308 | 309 | 310 | 311 | X | X | X | X | X | X | X |
| | 12 | 332 | 333 | 334 | 335 | 336 | 337 | 338 | 339 | 340 | 341 | 342 | X | X | X | X | X | X |

TABLE 10-continued

| | | | | | | | | | | | | | | | | | |
|---|---|---|---|---|---|---|---|---|---|---|---|---|---|---|---|---|---|
| 13 | 382 | 363 | 364 | 365 | 366 | 367 | 368 | 369 | 370 | 371 | 372 | 373 | X | X | X | X | X |
| 14 | 392 | 393 | 394 | 395 | 396 | 397 | 398 | 399 | 400 | 401 | 402 | 403 | 404 | X | X | X | X |
| 15 | 422 | 423 | 424 | 425 | 426 | 427 | 428 | 429 | 430 | 431 | 432 | 433 | 434 | 435 | X | X | X |
| 16 | 452 | 453 | 454 | 455 | 456 | 457 | 458 | 459 | 460 | 461 | 462 | 463 | 464 | 465 | 466 | X | X |
| 17 | 451 | 450 | 449 | 448 | 447 | 446 | 445 | 444 | 443 | 442 | 441 | 440 | 439 | 438 | 437 | 436 | X |
| 18 | 421 | 420 | 419 | 418 | 417 | 416 | 415 | 414 | 413 | 412 | 411 | 410 | 409 | 408 | 407 | 406 | 405 |
| 19 | 391 | 390 | 389 | 388 | 387 | 386 | 385 | 384 | 383 | 382 | 381 | 380 | 379 | 378 | 377 | 376 | 375 |
| 20 | 361 | 360 | 359 | 358 | 357 | 356 | 355 | 354 | 353 | 352 | 351 | 350 | 349 | 348 | 347 | 346 | 345 |
| 21 | 331 | 330 | 329 | 328 | 327 | 326 | 325 | 324 | 323 | 322 | 321 | 320 | 319 | 318 | 317 | 316 | 315 |
| 22 | 301 | 300 | 299 | 298 | 297 | 296 | 295 | 294 | 293 | 292 | 291 | 290 | 289 | 238 | 287 | 286 | 285 |
| 23 | 271 | 270 | 269 | 268 | 267 | 266 | 265 | 264 | 263 | 262 | 261 | 260 | 259 | 258 | 257 | 256 | 255 |
| 24 | 241 | 240 | 239 | 238 | 237 | 236 | 235 | 234 | 233 | 232 | 231 | 230 | 229 | 228 | 227 | 226 | 225 |
| 25 | 211 | 210 | 209 | 208 | 207 | 206 | 205 | 204 | 203 | 202 | 201 | 200 | 199 | 198 | 197 | 196 | 195 |
| 26 | 181 | 180 | 179 | 178 | 177 | 176 | 175 | 174 | 173 | 172 | 171 | 170 | 169 | 168 | 167 | 166 | 165 |
| 27 | 151 | 150 | 149 | 148 | 147 | 146 | 145 | 144 | 143 | 142 | 141 | 140 | 139 | 138 | 137 | 136 | 135 |
| 28 | 121 | 120 | 119 | 118 | 117 | 116 | 115 | 114 | 113 | 112 | 111 | 110 | 109 | 108 | 107 | 106 | 105 |
| 29 | 91 | 90 | 89 | 88 | 87 | 86 | 85 | 84 | 83 | S2 | 81 | 80 | 79 | 78 | 77 | 76 | 75 |
| 30 | 61 | 60 | 59 | 58 | 57 | 56 | 55 | 54 | 53 | 52 | 51 | 50 | 49 | 48 | 47 | 46 | 45 |

| code-point r | | T1 | | | | | | | | | | | |
|---|---|---|---|---|---|---|---|---|---|---|---|---|---|
| | | 18 | 19 | 20 | 21 | 22 | 23 | 24 | 25 | 26 | 27 | 28 | 29 | 30 |
| T2 | 1 | X | X | X | X | X | X | X | X | X | X | X | X | X |
| | 2 | X | X | X | X | X | X | X | X | X | X | X | X | X |
| | 3 | X | X | X | X | X | X | X | X | X | X | X | X | X |
| | 4 | X | X | X | X | X | X | X | X | X | X | X | X | X |
| | 5 | X | X | X | X | X | X | X | X | X | X | X | X | X |
| | 6 | X | X | X | X | X | X | X | X | X | X | X | X | X |
| | 7 | X | X | X | X | X | X | X | X | X | X | X | X | X |
| | 8 | X | X | X | X | X | X | X | X | X | X | X | X | X |
| | 9 | X | X | X | X | X | X | X | X | X | X | X | X | X |
| | 10 | X | X | X | X | X | X | X | X | X | X | X | X | X |
| | 11 | X | X | X | X | X | X | X | X | X | X | X | X | X |
| | 12 | X | X | X | X | X | X | X | X | X | X | X | X | X |
| | 13 | X | X | X | X | X | X | X | X | X | X | X | X | X |
| | 14 | X | X | X | X | X | X | X | X | X | X | X | X | X |
| | 15 | X | X | X | X | X | X | X | X | X | X | X | X | X |
| | 16 | X | X | X | X | X | X | X | X | X | X | X | X | X |
| | 17 | X | X | X | X | X | X | X | X | X | X | X | X | X |
| | 18 | X | X | X | X | X | X | X | X | X | X | X | X | X |
| | 19 | 374 | X | X | X | X | X | X | X | X | X | X | X | X |
| | 20 | 344 | 343 | X | X | X | X | X | X | X | X | X | X | X |
| | 21 | 314 | 313 | 312 | X | X | X | X | X | X | X | X | X | X |
| | 22 | 284 | 283 | 282 | 281 | X | X | X | X | X | X | X | X | X |
| | 23 | 254 | 253 | 252 | 251 | 250 | X | X | X | X | X | X | X | X |
| | 24 | 224 | 223 | 222 | 221 | 220 | 219 | X | X | X | X | X | X | X |
| | 25 | 194 | 193 | 192 | 191 | 190 | 189 | 188 | X | X | X | X | X | X |
| | 26 | 164 | 163 | 162 | 161 | 160 | 159 | 158 | 157 | X | X | X | X | X |
| | 27 | 134 | 133 | 132 | 131 | 130 | 129 | 128 | 127 | 126 | X | X | X | X |
| | 28 | 104 | 103 | 102 | 101 | 100 | 99 | 96 | 97 | 96 | 95 | X | X | X |
| | 29 | 74 | 73 | 72 | 71 | 70 | 69 | 68 | 67 | 66 | 65 | 64 | X | X |
| | 30 | 44 | 43 | 42 | 41 | 40 | 39 | 38 | 37 | 36 | 35 | 34 | 33 | X |

Method B2: The method B1 may be modified and applied as follows.

If $T2 \leq \lfloor W/2 \rfloor$ then $r = (W-1) \times (T1-1) + T2 + 1$ else $r = (W-1) \times (W-T1) + W - T2 + 1$ In the above method, the method of calculating r according to T0, T1, and T2 was described, but from the point of view of the receiving terminal, the r value can be obtained from the control information SCI, and information on the n value, T0, T1, and T2 can be obtained from r using the obtained r value and the above method. The terminal can obtain T0, T1, and T2 from the r value by the above calculation formulas. Alternatively, the table as described above is stored in advance, and when r is indicated, the values of T0, T1, and T2 can be found using the table.

Third Embodiment

The third embodiment provides another method and apparatus for allocating frequency-time resources and transmitting the frequency-time resources to a receiving terminal in a process in which a terminal performs detection and resource selection and transmits data in a sidelink.

The information for allocating up to Nmax frequency-time resources may be transmitted by a transmitting terminal to a receiving terminal in sidelink control information. The Nmax may be a configured value, and for example, may be set to 2 or 3. For example, when Nmax is configured as 3, up to 3 pieces of resource assignment information may be delivered in SCI. Of course, when Nmax is configured as 3, only one piece of resource assignment information may be delivered, only two pieces of resource assignment information may be delivered, or three pieces of resource assignment information may be delivered. The range of frequency-time resources that can be assigned in the above may be given by W. For example, the time range of the assigned resources that can be indicated by the SCI may be W. The W may be given as the number of slots. For example, W may be given as 32, which means that Nmax pieces of resource assignment information can be transmitted within 32 slots in SCI.

In the disclosure, r may be called a time resource indication value (TRIV).

FIGS. 9A, 9B, and 9C are diagrams illustrating a process of detecting SCI related to an embodiment.

In the above, a transmitting terminal allocates Nmax resources, but this is a resource for PSSCH transmission within one period, and after that, the transmitting terminal indicates a predetermined period, so that the location information of Nmax resources in the next period can be transmitted to a receiving terminal. For example, when three pieces of resource assignment information is transmitted in section 1 to the receiving terminal in FIG. 10, it may indicate three resource assignment information in section 2 corresponding to the next period. In this embodiment of the disclosure, a method of transmitting information of T0, or T0 and T1, or T0, T1, and T2 is provided. In this case, T0, T1, and T2 may each be assigned as a position of a slot in which the PSSCH is transmitted or an offset value from the slot of T0 according to the order of transmission within a period. T0 is a slot in which the first transmission in a section is performed, and if T0, T1, and T2 are defined as offsets according to a relative distance from T0, T0=0 may be determined. For example, if the receiving terminal receives the SCI at the location T0, T1, or T2 and analyzes the time resource assignment information, the absolute slot index of T0, T1, and T2 can be calculated from the slot in which the corresponding SCI is detected. For the calculation, it is necessary to find out which assignment resources the SCI and PSSCH transmitted in the corresponding interval are. For example, when the receiving terminal detects SCI in the T1 slot in section 1 in FIG. 10, an indicator that allows it to know that the corresponding transmission corresponds to 1-2 (that is, the second transmission in section 1) rather than 1-1 or 1-3 should be known in the SCI.

These indicators or information may be indicated by 1 bit when Nmax=2 is (pre-) configured, and may be indicated by 2 bits when Nmax=3 is configured. In this case, it may be indicated in the same way as Table 4, Table 5, and Table 6. The method of Table 5 may be arranged so that values indicating the first transmission and the second transmission when N=2 are farthest from the code so as to be robust against SCI decoding errors of the receiving terminal when N=2.

In Table 6, Reserved is limited to 11, but it can be applied even when other values are reserved and used.

FIG. 11 is a diagram illustrating a process of detecting SCI related to an embodiment of the disclosure.

Referring to FIG. 11, a slot in which SCI is detected is set to T0, and T1 and T2 may mean a difference between a specific slot and another slot. In FIG. 11, in section 1, the SCI detection slot is a slot for the second transmission in the section. In this case, T0 may be a slot in which the second transmission is performed, and based on this, the relative position of the slot in which the first transmission is performed may be T1, and the relative position of the third transmission slot based on the first transmission may be T2. In section 2, the SCI detection slot is the slot for the third transmission in the section. In this case, T0 may be a slot in which the third transmission is performed, the relative position of the slot in which the second transmission is performed, based on T0 may be T1, and the relative position of the first transmission slot, based on T0 may be T2.

Here, T0 is assumed to be 0 and may be the first transmission or the slot of the first resource in the section W, T1 may be referred to as the gap between the second transmission in the section W or the second resource slot from T0, or the slot difference in the resource pool, and T2 may be referred to as a gap of a third transmission or a third resource slot in a section W from T0, or a slot difference in a resource pool. N is the number of resources actually allocated in the section W, and may be determined to be smaller than Nmax. In this case, r may be determined by N, T1, and T2, as shown in Table 11 below.

TABLE 11

If N = 1, R = 0,
if N = 2, R = T1,
other cases, defined as
   S = T1
   L = T2−T1+1
   If (L−1) ≤ floor (W/2), r=(W−1)(L−1)+S
   else, r=(W−1)(W−1−L)+W−2−S If W=32, the process may be as shown in Table 12 below.

TABLE 12

If N = 1, r = 0,
if N = 2, r = T1,
other cases, defined as
   S = T1
   L = T2−T1+1
   If (L−1) ≤ 15, r=31(L−1)+S
   else, r=31(31−L)+30−S The r value according to the above process can be calculated as shown in Table 13 below.

TABLE 13

| code-point r | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| T2 | 1 | X | X | X | X | X | X | X | X | X | X | X | X | X | X | X | X | X |
| | 2 | 32 | X | X | X | X | X | X | X | X | X | X | X | X | X | X | X | X |
| | 3 | 63 | 33 | X | X | X | X | X | X | X | X | X | X | X | X | X | X | X |
| | 4 | 94 | 64 | 34 | X | X | X | X | X | X | X | X | X | X | X | X | X | X |
| | 5 | 125 | 95 | 65 | 35 | X | X | X | X | X | X | X | X | X | X | X | X | X |
| | 6 | 156 | 126 | 96 | 66 | 36 | X | X | X | X | X | X | X | X | X | X | X | X |
| | 7 | 187 | 157 | 127 | 97 | 67 | 37 | X | X | X | X | X | X | X | X | X | X | X |
| | 8 | 218 | 188 | 158 | 128 | 98 | 68 | 38 | X | X | X | X | X | X | X | X | X | X |
| | 9 | 249 | 219 | 189 | 159 | 129 | 99 | 69 | 39 | X | X | X | X | X | X | X | X | X |
| | 10 | 280 | 250 | 220 | 190 | 160 | 130 | 100 | 70 | 40 | X | X | X | X | X | X | X | X |
| | 11 | 311 | 281 | 251 | 221 | 191 | 161 | 131 | 101 | 71 | 41 | X | X | X | X | X | X | X |
| | 12 | 342 | 312 | 282 | 252 | 222 | 192 | 162 | 132 | 102 | 72 | 42 | X | X | X | X | X | X |

TABLE 13-continued

| | | | | | | | | | | | | | | | | | |
|---|---|---|---|---|---|---|---|---|---|---|---|---|---|---|---|---|---|
| 13 | 373 | 343 | 313 | 283 | 253 | 223 | 193 | 163 | 133 | 103 | 73 | 43 | X | X | X | X | X |
| 14 | 404 | 374 | 344 | 314 | 284 | 254 | 224 | 194 | 164 | 134 | 104 | 74 | 44 | X | X | X | X |
| 15 | 435 | 405 | 375 | 345 | 315 | 285 | 255 | 225 | 195 | 165 | 135 | 105 | 75 | 45 | X | X | X |
| 16 | 466 | 436 | 406 | 376 | 346 | 316 | 286 | 256 | 226 | 196 | 166 | 136 | 106 | 76 | 46 | X | X |
| 17 | 463 | 467 | 437 | 407 | 377 | 347 | 317 | 287 | 257 | 227 | 197 | 167 | 137 | 107 | 77 | 47 | X |
| 18 | 432 | 462 | 468 | 438 | 408 | 378 | 348 | 318 | 288 | 258 | 228 | 198 | 168 | 138 | 108 | 78 | 48 |
| 19 | 401 | 431 | 461 | 469 | 439 | 409 | 375 | 345 | 315 | 289 | 259 | 229 | 199 | 169 | 139 | 109 | 79 |
| 20 | 370 | 400 | 430 | 460 | 470 | 440 | 410 | 380 | 350 | 320 | 290 | 260 | 230 | 200 | 170 | 140 | 110 |
| 21 | 339 | 369 | 399 | 429 | 459 | 471 | 441 | 411 | 381 | 351 | 322 | 291 | 261 | 231 | 201 | 171 | 141 |
| 22 | 308 | 338 | 368 | 398 | 428 | 458 | 472 | 442 | 412 | 382 | 352 | 322 | 292 | 262 | 232 | 202 | 172 |
| 23 | 277 | 307 | 337 | 367 | 397 | 427 | 457 | 473 | 443 | 413 | 383 | 353 | 323 | 293 | 263 | 233 | 203 |
| 24 | 246 | 276 | 306 | 336 | 366 | 396 | 426 | 456 | 474 | 444 | 414 | 384 | 354 | 324 | 294 | 264 | 234 |
| 25 | 215 | 245 | 275 | 305 | 335 | 365 | 395 | 425 | 455 | 475 | 445 | 415 | 385 | 355 | 325 | 295 | 265 |
| 26 | 184 | 214 | 244 | 274 | 304 | 334 | 364 | 394 | 424 | 454 | 476 | 446 | 416 | 386 | 356 | 526 | 296 |
| 27 | 153 | 183 | 213 | 243 | 273 | 303 | 333 | 363 | 393 | 423 | 453 | 477 | 447 | 417 | 387 | 357 | 327 |
| 28 | 122 | 152 | 182 | 212 | 242 | 272 | 302 | 332 | 362 | 392 | 422 | 452 | 478 | 448 | 418 | 388 | 358 |
| 29 | 91 | 121 | 151 | 181 | 211 | 241 | 271 | 301 | 331 | 361 | 391 | 421 | 451 | 479 | 449 | 419 | 389 |
| 30 | 60 | 90 | 120 | 150 | 180 | 210 | 240 | 270 | 300 | 330 | 560 | 390 | 420 | 450 | 480 | 450 | 420 |
| 31 | 29 | 59 | 89 | 119 | 149 | 179 | 209 | 239 | 269 | 299 | 329 | 359 | 389 | 419 | 449 | 481 | 451 |

| code- | | | | | | | | T1 | | | | | | | | |
|---|---|---|---|---|---|---|---|---|---|---|---|---|---|---|---|---|
| point r | | 18 | 19 | 20 | 21 | 22 | 23 | 24 | 25 | 26 | 27 | 28 | 29 | 30 | 31 |
| T2 | 1 | X | X | X | X | X | X | X | X | X | X | X | X | X | X |
| | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |
| | 16 | X | X | X | X | X | X | X | X | X | X | X | X | X | X |
| | 17 | X | X | X | X | X | X | X | X | X | X | X | X | X | X |
| | 18 | X | X | X | X | X | X | X | X | X | X | X | X | X | X |
| | 19 | 49 | X | X | X | X | X | X | X | X | X | X | X | X | X |
| | 20 | 80 | 50 | X | X | X | X | X | X | X | X | X | X | X | X |
| | 21 | 111 | 81 | 51 | X | X | X | X | X | X | X | X | X | X | X |
| | 22 | 142 | 112 | 82 | 52 | X | X | X | X | X | X | X | X | X | X |
| | 23 | 173 | 143 | 113 | 83 | 53 | X | X | X | X | X | X | X | X | X |
| | 24 | 204 | 174 | 144 | 114 | 84 | 54 | X | X | X | X | X | X | X | X |
| | 25 | 235 | 205 | 175 | 145 | 115 | 85 | 55 | X | X | X | X | X | X | X |
| | 26 | 266 | 236 | 206 | 176 | 146 | 116 | 86 | 56 | X | X | X | X | X | X |
| | 27 | 297 | 267 | 237 | 207 | 177 | 147 | 117 | 87 | 57 | X | X | X | X | X |
| | 28 | 328 | 298 | 268 | 238 | 208 | 178 | 148 | 118 | 88 | 58 | X | X | X | X |
| | 29 | 359 | 329 | 299 | 269 | 239 | 209 | 179 | 149 | 119 | 89 | 59 | X | X | X |
| | 30 | 390 | 360 | 330 | 300 | 270 | 240 | 210 | 180 | 150 | 120 | 90 | 60 | X | X |
| | 31 | 421 | 391 | 361 | 331 | 301 | 271 | 241 | 211 | 181 | 151 | 121 | 91 | 61 | X |

In the case of the cells indicated in bold in Table 13, L−1≤15.

As described above, in the above method, since r values when T2=31 are overlapped with other cases, the transmitting/receiving terminal cannot have consistent information according to resource assignment using the above method. For example, when T1=1 and T2=31, r=29 appears, but this is the same as the r value when N=2 and T1=29, so after confirming r=29, the receiving terminal cannot know whether N=3 and T1=1, 2=31, or N=2 and T1=29.

To compensate for this, the r value may be calculated by the method shown in Table 14 below.

TABLE 14

If N = 1, r = 0,
if N = 2, r = T1,

TABLE 14-continued other cases,

If T2 ≤ [w/2] then r=(W−1)*(T−1)+T1 else r=(W−1)*(W−T2)+W−T1

If W=32, it may be determined as shown in Table 15 below.

TABLE 15

If N = 1, r = 0,
if N = 2, r = T1,

TABLE 15-continued other cases,

If T2 ≤ 16 then $r = 31*(T2-1) + T1$ else $r = 31*(32-T2) + 32-T1$

The r value according to the above process can be calculated as shown in Table 16 below.

TABLE 16

| code-point r | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| T2 | 1 | X | X | X | X | X | X | X | X | X | X | X | X | X | X | X | X | X |
| | 2 | 32 | X | X | X | X | X | X | X | X | X | X | X | X | X | X | X | X |
| | 3 | 63 | 64 | X | X | X | X | X | X | X | X | X | X | X | X | X | X | X |
| | 4 | 94 | 95 | 96 | X | X | X | X | X | X | X | X | X | X | X | X | X | X |
| | 5 | 125 | 126 | 127 | 128 | X | X | X | X | X | X | X | X | X | X | X | X | X |
| | 6 | 156 | 157 | 158 | 159 | 160 | X | X | X | X | X | X | X | X | X | X | X | X |
| | 7 | 187 | 188 | 189 | 190 | 191 | 192 | X | X | X | X | X | X | X | X | X | X | X |
| | 8 | 218 | 219 | 220 | 221 | 222 | 223 | 224 | X | X | X | X | X | X | X | X | X | X |
| | 9 | 249 | 250 | 251 | 252 | 253 | 254 | 255 | 256 | X | X | X | X | X | X | X | X | X |
| | 10 | 280 | 281 | 282 | 283 | 284 | 285 | 286 | 287 | 288 | X | X | X | X | X | X | X | X |
| | 11 | 311 | 312 | 313 | 314 | 315 | 216 | 317 | 318 | 319 | 320 | X | X | X | X | X | X | X |
| | 12 | 342 | 343 | 344 | 345 | 346 | 347 | 348 | 349 | 350 | 351 | 352 | X | X | X | X | X | X |
| | 13 | 373 | 374 | 375 | 376 | 377 | 378 | 379 | 380 | 381 | 382 | 383 | 384 | X | X | X | X | X |
| | 14 | 404 | 405 | 406 | 407 | 408 | 409 | 410 | 411 | 412 | 413 | 414 | 415 | 416 | X | X | X | X |
| | 15 | 435 | 436 | 437 | 438 | 439 | 440 | 441 | 442 | 443 | 444 | 445 | 446 | 447 | 448 | X | X | X |
| | 16 | 466 | 467 | 468 | 469 | 470 | 471 | 472 | 473 | 474 | 475 | 476 | 477 | 478 | 479 | 480 | X | X |
| | 17 | 496 | 495 | 494 | 493 | 492 | 491 | 490 | 489 | 488 | 487 | 486 | 485 | 484 | 483 | 482 | 481 | X |
| | 18 | 465 | 464 | 463 | 462 | 461 | 460 | 459 | 458 | 457 | 456 | 455 | 454 | 453 | 452 | 451 | 450 | 449 |
| | 19 | 434 | 433 | 432 | 431 | 439 | 429 | 428 | 427 | 426 | 425 | 424 | 423 | 422 | 421 | 420 | 419 | 418 |
| | 20 | 403 | 402 | 401 | 400 | 399 | 398 | 397 | 396 | 395 | 394 | 393 | 392 | 391 | 390 | 389 | 388 | 387 |
| | 21 | 372 | 371 | 370 | 369 | 368 | 367 | 366 | 365 | 364 | 363 | 362 | 361 | 360 | 359 | 358 | 357 | 356 |
| | 22 | 341 | 340 | 339 | 338 | 337 | 336 | 335 | 334 | 333 | 332 | 331 | 330 | 329 | 328 | 327 | 326 | 325 |
| | 23 | 310 | 309 | 308 | 307 | 306 | 305 | 304 | 303 | 302 | 301 | 300 | 299 | 298 | 297 | 296 | 295 | 294 |
| | 24 | 279 | 278 | 277 | 277 | 277 | 277 | 277 | 277 | 277 | 277 | 277 | 277 | 277 | 277 | 277 | 277 | 277 |
| | 25 | 248 | 247 | 246 | 245 | 244 | 243 | 242 | 241 | 240 | 239 | 238 | 237 | 236 | 235 | 234 | 233 | 232 |
| | 26 | 217 | 216 | 215 | 214 | 213 | 212 | 211 | 210 | 209 | 208 | 207 | 206 | 205 | 204 | 203 | 202 | 201 |
| | 27 | 186 | 185 | 184 | 183 | 182 | 181 | 180 | 179 | 178 | 177 | 176 | 175 | 174 | 173 | 172 | 171 | 170 |
| | 28 | 155 | 154 | 153 | 152 | 151 | 150 | 149 | 148 | 147 | 146 | 145 | 144 | 143 | 142 | 141 | 140 | 139 |
| | 29 | 124 | 123 | 122 | 121 | 120 | 119 | 118 | 117 | 116 | 115 | 114 | 113 | 112 | 111 | 110 | 109 | 108 |
| | 30 | 93 | 92 | 91 | 90 | 89 | 88 | 87 | 86 | 85 | 84 | 83 | 82 | 81 | 80 | 79 | 78 | 77 |
| | 31 | 62 | 61 | 60 | 59 | 58 | 57 | 56 | 55 | 54 | 53 | 52 | 51 | 50 | 49 | 48 | 47 | 46 |

| code-point r | | T1 | | | | | | | | | | | | | |
|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 |
| T2 | 1 | X | X | X | X | X | X | X | X | X | X | X | X | X | X |
| | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |
| | 16 | X | X | X | X | X | X | X | X | X | X | X | X | X | X |
| | 17 | X | X | X | X | X | X | X | X | X | X | X | X | X | X |
| | 18 | X | X | X | X | X | X | X | X | X | X | X | X | X | X |
| | 19 | 417 | X | X | X | X | X | X | X | X | X | X | X | X | X |
| | 20 | 386 | 385 | X | X | X | X | X | X | X | X | X | X | X | X |
| | 21 | 355 | 354 | 353 | X | X | X | X | X | X | X | X | X | X | X |
| | 22 | 324 | 323 | 322 | 321 | X | X | X | X | X | X | X | X | X | X |
| | 23 | 293 | 292 | 291 | 290 | 289 | X | X | X | X | X | X | X | X | X |
| | 24 | 277 | 277 | 277 | 277 | 277 | 277 | X | X | X | X | X | X | X | X |
| | 25 | 231 | 230 | 229 | 228 | 227 | 226 | 225 | X | X | X | X | X | X | X |
| | 26 | 200 | 199 | 198 | 197 | 196 | 195 | 194 | 193 | X | X | X | X | X | X |
| | 27 | 169 | 168 | 167 | 166 | 165 | 164 | 163 | 162 | 161 | X | X | X | X | X |
| | 28 | 138 | 137 | 136 | 135 | 134 | 133 | 132 | 131 | 130 | 129 | X | X | X | X |

TABLE 16-continued

| | | | | | | | | | | | | | | |
|---|---|---|---|---|---|---|---|---|---|---|---|---|---|---|
| 29 | 107 | 106 | 105 | 104 | 103 | 102 | 101 | 100 | 99 | 98 | 97 | X | X | X |
| 30 | 76 | 75 | 74 | 73 | 72 | 71 | 70 | 69 | 68 | 67 | 66 | 65 | X | X |
| 31 | 45 | 44 | 43 | 42 | 41 | 40 | 39 | 38 | 37 | 36 | 35 | 34 | 33 | X |

Alternatively, r may be determined by N, T1, and T2 as shown in Table 17 below.

TABLE 17

If N = 1, r = 0,
if N = 2, r = T1,
other cases (i.e., N=3), defined as
    S = T1
    L = T2−T1+1,
    If (L−1) ≤ floor(W/2), r=(W−1)(L−1)+S
    else, r=(W−1)(W−L)+W−S If W=32, the process may be as shown in Table 18 below.

TABLE 18

If N = 1, r = 0,
if N = 2, r = T1,
other cases (i.e., N=3), defined as
    S = T1
    L = T2−T1+1,
    If (L−1) ≤ 15, r=31(L−1)+S
    else, r=31(32−L)+32−S The r value according to the above process can be calculated as shown in Table 19 below.

TABLE 19

| code-point r | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| T2 | 1 | X | X | X | X | X | X | X | X | X | X | X | X | X | X | X | X | X |
| | 2 | 32 | X | X | X | X | X | X | X | X | X | X | X | X | X | X | X | X |
| | 3 | 63 | 33 | X | X | X | X | X | X | X | X | X | X | X | X | X | X | X |
| | 4 | 94 | 64 | 34 | X | X | X | X | X | X | X | X | X | X | X | X | X | X |
| | 5 | 125 | 95 | 65 | 35 | X | X | X | X | X | X | X | X | X | X | X | X | X |
| | 6 | 156 | 126 | 96 | 66 | 36 | X | X | X | X | X | X | X | X | X | X | X | X |
| | 7 | 187 | 157 | 127 | 97 | 67 | 37 | X | X | X | X | X | X | X | X | X | X | X |
| | 8 | 218 | 188 | 158 | 128 | 98 | 68 | 38 | X | X | X | X | X | X | X | X | X | X |
| | 9 | 249 | 219 | 189 | 159 | 129 | 99 | 69 | 39 | X | X | X | X | X | X | X | X | X |
| | 10 | 280 | 250 | 220 | 190 | 160 | 130 | 100 | 70 | 40 | X | X | X | X | X | X | X | X |
| | 11 | 311 | 281 | 251 | 221 | 191 | 161 | 131 | 101 | 71 | 41 | X | X | X | X | X | X | X |
| | 12 | 342 | 312 | 282 | 252 | 222 | 192 | 162 | 132 | 102 | 72 | 42 | X | X | X | X | X | X |
| | 13 | 373 | 343 | 313 | 283 | 253 | 223 | 193 | 163 | 133 | 103 | 73 | 43 | X | X | X | X | X |
| | 14 | 404 | 374 | 344 | 314 | 284 | 254 | 224 | 194 | 164 | 134 | 104 | 74 | 44 | X | X | X | X |
| | 15 | 435 | 405 | 375 | 345 | 315 | 285 | 255 | 225 | 195 | 165 | 135 | 105 | 75 | 45 | X | X | X |
| | 16 | 466 | 436 | 406 | 376 | 346 | 316 | 286 | 256 | 226 | 196 | 166 | 136 | 106 | 76 | 46 | X | X |
| | 17 | 496 | 467 | 437 | 407 | 377 | 347 | 317 | 287 | 257 | 227 | 197 | 167 | 137 | 107 | 77 | 47 | X |
| | 18 | 465 | 495 | 468 | 438 | 408 | 378 | 348 | 318 | 288 | 258 | 228 | 198 | 168 | 138 | 108 | 78 | 48 |
| | 19 | 434 | 464 | 494 | 469 | 439 | 409 | 379 | 349 | 319 | 289 | 259 | 229 | 199 | 169 | 139 | 109 | 79 |
| | 20 | 403 | 433 | 463 | 493 | 470 | 440 | 410 | 380 | 350 | 320 | 290 | 260 | 230 | 200 | 170 | 140 | 110 |
| | 21 | 372 | 402 | 432 | 462 | 492 | 471 | 441 | 411 | 381 | 351 | 321 | 291 | 261 | 231 | 201 | 171 | 141 |
| | 22 | 341 | 371 | 401 | 431 | 461 | 491 | 472 | 442 | 412 | 382 | 352 | 322 | 292 | 262 | 232 | 202 | 172 |
| | 23 | 310 | 340 | 370 | 400 | 430 | 460 | 490 | 473 | 443 | 413 | 383 | 353 | 323 | 293 | 263 | 233 | 203 |
| | 24 | 279 | 309 | 339 | 369 | 399 | 429 | 459 | 489 | 474 | 444 | 414 | 384 | 354 | 324 | 294 | 264 | 234 |
| | 25 | 248 | 278 | 308 | 338 | 368 | 398 | 428 | 458 | 488 | 475 | 445 | 415 | 385 | 355 | 325 | 295 | 265 |
| | 26 | 217 | 247 | 277 | 307 | 337 | 367 | 397 | 427 | 457 | 487 | 476 | 446 | 416 | 386 | 356 | 326 | 296 |
| | 27 | 186 | 216 | 246 | 276 | 306 | 336 | 366 | 396 | 426 | 456 | 486 | 477 | 447 | 417 | 387 | 357 | 327 |
| | 28 | 155 | 185 | 215 | 245 | 275 | 305 | 335 | 365 | 395 | 425 | 455 | 485 | 478 | 448 | 418 | 583 | 358 |
| | 29 | 124 | 154 | 184 | 214 | 244 | 274 | 304 | 334 | 364 | 394 | 424 | 454 | 484 | 479 | 449 | 419 | 389 |
| | 30 | 93 | 123 | 153 | 183 | 213 | 243 | 273 | 303 | 333 | 363 | 393 | 423 | 453 | 483 | 480 | 450 | 420 |
| | 31 | 62 | 92 | 122 | 152 | 182 | 212 | 242 | 272 | 302 | 332 | 362 | 392 | 422 | 452 | 482 | 481 | 451 |
| code-point r | | T1 | | | | | | | | | | | | | |
| | | 18 | 19 | 20 | 21 | 22 | 23 | 24 | 25 | 26 | 27 | 28 | 29 | 30 | 31 |
| T2 | 1 | X | X | X | X | X | X | X | X | X | X | X | X | X | X |
| | 2 | X | X | X | X | X | X | X | X | X | X | X | X | X | X |
| | 3 | X | X | X | X | X | X | X | X | X | X | X | X | X | X |
| | 4 | X | X | X | X | X | X | X | X | X | X | X | X | X | X |
| | 5 | X | X | X | X | X | X | X | X | X | X | X | X | X | X |
| | 6 | X | X | X | X | X | X | X | X | X | X | X | X | X | X |
| | 7 | X | X | X | X | X | X | X | X | X | X | X | X | X | X |
| | 8 | X | X | X | X | X | X | X | X | X | X | X | X | X | X |
| | 9 | X | X | X | X | X | X | X | X | X | X | X | X | X | X |
| | 10 | X | X | X | X | X | X | X | X | X | X | X | X | X | X |
| | 11 | X | X | X | X | X | X | X | X | X | X | X | X | X | X |
| | 12 | X | X | X | X | X | X | X | X | X | X | X | X | X | X |
| | 13 | X | X | X | X | X | X | X | X | X | X | X | X | X | X |
| | 14 | X | X | X | X | X | X | X | X | X | X | X | X | X | X |
| | 15 | X | X | X | X | X | X | X | X | X | X | X | X | X | X |

TABLE 19-continued

|    |     |     |     |     |     |     |     |     |     |     |     |    |   |
|----|-----|-----|-----|-----|-----|-----|-----|-----|-----|-----|-----|----|---|
| 16 | X   | X   | X   | X   | X   | X   | X   | X   | X   | X   | X   | X  | X |
| 17 | X   | X   | X   | X   | X   | X   | X   | X   | X   | X   | X   | X  | X |
| 18 | X   | X   | X   | X   | X   | X   | X   | X   | X   | X   | X   | X  | X |
| 19 | 49  | X   | X   | X   | X   | X   | X   | X   | X   | X   | X   | X  | X |
| 20 | 80  | 50  | X   | X   | X   | X   | X   | X   | X   | X   | X   | X  | X |
| 21 | 111 | 81  | 51  | X   | X   | X   | X   | X   | X   | X   | X   | X  | X |
| 22 | 142 | 112 | 82  | 52  | X   | X   | X   | X   | X   | X   | X   | X  | X |
| 23 | 173 | 143 | 113 | 83  | 53  | X   | X   | X   | X   | X   | X   | X  | X |
| 24 | 204 | 174 | 144 | 114 | 84  | 54  | X   | X   | X   | X   | X   | X  | X |
| 25 | 235 | 205 | 175 | 145 | 115 | 85  | 55  | X   | X   | X   | X   | X  | X |
| 26 | 266 | 236 | 206 | 176 | 146 | 116 | 86  | 56  | X   | X   | X   | X  | X |
| 27 | 297 | 267 | 237 | 207 | 177 | 147 | 117 | 87  | 57  | X   | X   | X  | X |
| 28 | 328 | 293 | 268 | 238 | 208 | 178 | 148 | 118 | 88  | 58  | X   | X  | X |
| 29 | 359 | 329 | 299 | 269 | 239 | 209 | 179 | 149 | 119 | 89  | 59  | X  | X |
| 30 | 390 | 360 | 330 | 300 | 270 | 240 | 210 | 180 | 150 | 120 | 90  | 60 | X |
| 31 | 421 | 391 | 361 | 331 | 301 | 271 | 241 | 211 | 181 | 151 | 121 | 91 | 61 | X |

In the case of the cells indicated in bold in Table 19, $L-1 \leq 15$.

The method may be written as shown in Table 20 below.

TABLE 20

```
if N = 1
    TRIV = 0
elseif N = 2
    TRIV = T₁
else
    S = T₁
    L = T₂ - T₁ + 1
    if (L - 1) ≤ 15
        TRIV = 31(L - 1) + S
    else
        TRIV = 31(32 - L) + 32 - S
    end if
end if
where
■ N denotes the number of resources indicated
■ Ti denotes i-th resource time offset
```

The method is shown in Table 21 below when expressed by T1 and T2. This may be to eliminate unnecessary use of S and L.

TABLE 21

```
If N = 1, r = 0,
if N = 2, r = T1,
other cases (i.e., N=3),
    If T2-T1 ≤ floor(W/2), r=(W-1)(T2-T1)+T1
    else, r=(W-1)(W-T2+T1-1)+W-T1
```

If W=32, the process may be as shown in Table 22 below.

TABLE 22

```
If N = 1, r = 0,
if N = 2, r = T1,
other cases (i.e., N=3),
    If T2-T1 ≤ 15, r=31(T2-T1)+T1
    else, r=31(31-T2+T1)+32-T1
```

The method may be written as shown in Table 23 below.

TABLE 23

```
if N = 1
    TRIV = 0
elseif N = 2
    TRIV = T₁
```

TABLE 23-continued

```
else
    if T₂ - T₁ ≤ 15
        TRIV = 31(T₂ - T₁) + T₁
    else
        TRIV = 31(31 - T₂ + T₁) + 32 - T₁
    end if
end if
where
■ N denotes the actual number of resources indicated
■ Ti denotes i-th resource time offset
```

In the disclosure, T0, T1, and T2 are integers, and therefore, since T0, T1, and T2 are integers, the same result is generated even if T2−T1<16 is changed and applied, so T2−T1≤15 may be modified and applied.

In the above, the index or offset of the slot may be based on slots belonging to a resource pool in which sidelink transmission/reception is performed. For example, the index or offset of the slot may be a logical slot index or an offset.

In the above method, the method of calculating r according to T0, T1, and T2 was described, but from the point of view of the receiving terminal, the r value can be obtained from the control information SCI, and information of the n value, T0, T1, and T2 can be obtained from r using the obtained r value and the above method. The terminal can obtain T0, T1, and T2 from the r value by the above calculation equations. Alternatively, if the above tables are stored in advance and r is indicated, the values of T0, T1, and T2 can be found using these tables.

Figure 12:
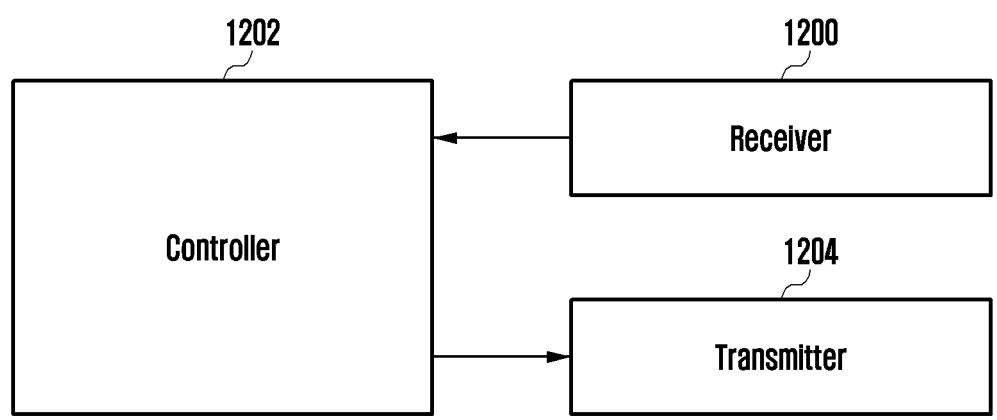
FIG. 12 is a diagram illustrating a structure of a terminal according to an embodiment of the disclosure.
Figure 13:
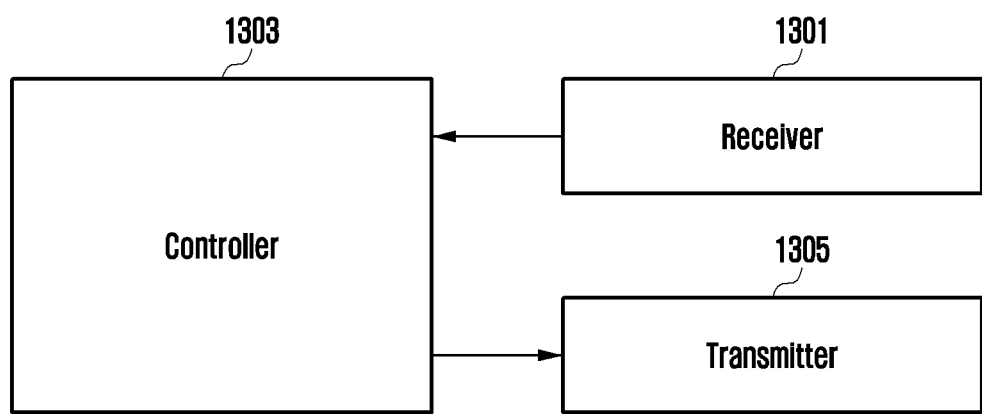
FIG. 13 is a diagram illustrating a structure of a base station according to an embodiment of the disclosure.

In order to perform the above embodiments of the disclosure, transmitters, receivers, and controllers of a terminal and a base station are illustrated in FIGS. 12 and 13, respectively. From the first to the third embodiments of the disclosure, a method for performing communication on a sidelink is illustrated, and in order to perform this, the receivers, controllers, and transmitters of the base station and the terminal should operate according to the respective embodiments.

FIG. 12 is a diagram illustrating a structure of a terminal according to an embodiment of the disclosure.

Referring to FIG. 12, the terminal of the disclosure may include a receiver 1200, a transmitter 1204, and a controller 1202. The receiver 1200 and the transmitter 1204 may be collectively referred to as a transceiver in an embodiment. The transceiver may transmit and receive signals with the base station. The signal may include control information and data. To this end, the transceiver may include an RF transmitter that up-converts and amplifies a frequency of a transmitted signal, and an RF receiver that amplifies a received signal with low noise and down-converts a frequency. In addition, the transceiver may receive a signal through a wireless channel, output the same to the controller 1202, and transmit a signal output from the controller 1202 through the wireless channel. The controller 1202 may control a series of processes so that the terminal can operate according to the embodiment described above. The controller 1202 may comprise a processor.

FIG. 13 is a diagram illustrating a structure of a base station according to an embodiment of the disclosure.

Referring to FIG. 13, the base station of the disclosure may include a receiver 1301, a transmitter 1305, and a controller 1303. The receiver 1301 and the transmitter 1305 may be collectively referred to as a transceiver in an embodiment. The transceiver may transmit and receive signals with the terminal. The signal may include control information and data. To this end, the transceiver may include an RF transmitter that up-converts and amplifies a frequency of a transmitted signal, and an RF receiver that amplifies a received signal with low noise and down-converts a frequency. In addition, the transceiver may receive a signal through a wireless channel, output it to the controller 1303, and transmit the signal output from the controller 1303 through the wireless channel. The controller 1303 may control a series of processes so that the base station can operate according to the above-described embodiment. The controller 1303 may comprise a processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
   identifying resource pool information configuring a maximum number of reserved physical sidelink shared channel (PSSCH) resources for a sidelink communication;
   transmitting, to a second terminal, sidelink control information (SCI) scheduling a PSSCH based on the resource pool information, the SCI including time resource assignment information associated with a slot offset indication of at least one slot for the PSSCH; and
   transmitting, to the second terminal, a sidelink data on the PSSCH based on the SCI,
   wherein a size of a bit field for the time resource assignment information is identified based on the maximum number of the reserved PSSCH resources configured by the resource pool information,
   wherein a value of the bit field for the time resource assignment information is identified based on a number of the at least one slot for the PSSCH,
   wherein in case that the number of the at least one slot for the PSSCH is 1, the value is zero,
   wherein, in case that the number of the at least one slot for the PSSCH is 2, the value is from 1 to 31, and
   wherein, in case that the number of the at least one slot for the PSSCH is 3, two slot offsets are obtained from the value.

2. The method of claim 1,
   wherein the resource pool information is included in at least one of pre-configuration, system information, or a radio resource control (RRC) message, and
   wherein the maximum number is configured to one of 2 or 3.

3. The method of claim 2,
   wherein, in case that the maximum number is configured to 2, the size of the bit field is identified as 5 bits, and
   wherein, in case that the maximum number is configured to 3, the size of the bit field is identified as 9 bits.

4. The method of claim 1,
   wherein each of the two slot offsets is a time offset in units of slots with respect to a first slot in which the SCI is transmitted, and
   wherein the value of the bit field including the time resource assignment information is a time resource indicator value (TRIV).

5. A method performed by a second terminal in a wireless communication system, the method comprising:
   receiving, from a first terminal, sidelink control information (SCI) scheduling a physical sidelink shared channel (PSSCH) based on resource pool information for a sidelink communication, the SCI including time resource assignment information associated with a slot offset indication of at least one slot for the PSSCH; and
   receiving, from the second terminal, a sidelink data on the PSSCH based on the SCI,
   wherein the resource pool information configures a maximum number of reserved PSSCH resources,
   wherein a size of a bit field for the time resource assignment information is identified based on the maximum number of the reserved PSSCH resources configured by the resource pool information,
   wherein a value of the bit field for the time resource assignment information is identified based on a number of the at least one slot for the PSSCH,
   wherein in case that the number of the at least one slot for the PSSCH is 1, the value is zero,
   wherein, in case that the number of the at least one slot for the PSSCH is 2, the value is from 1 to 31, and
   wherein, in case that the number of the at least one slot for the PSSCH is 3, two slot offsets are obtained from the value.

6. The method of claim 5,
   wherein the resource pool information is included in at least one of pre-configuration, system information, or a radio resource control (RRC) message, and
   wherein the maximum number is configured to one of 2 or 3.

7. The method of claim 6,
   wherein, in case that the maximum number is configured to 2, the size of the bit field is identified as 5 bits, and
   wherein, in case that the maximum number is configured to 3, the size of the bit field is identified as 9 bits.

8. The method of claim 5,
   wherein each of the two slot offsets is a time offset in units of slots with respect to a first slot in which the SCI is received, and
   wherein the value of the bit field including the time resource assignment information is a time resource indicator value (TRIV).

9. A first terminal in a wireless communication system, the first terminal comprising:
   a transceiver configured to transmit and receive a signal; and
   a controller coupled with the transceiver and configured to:
   identify resource pool information configuring a maximum number of reserved physical sidelink shared channel (PSSCH) resources for a sidelink communication, transmit, to a second terminal, sidelink control information (SCI) scheduling a PSSCH based on the resource pool information, the SCI including time resource assignment information associated with a slot offset indication of at least one slot for the PSSCH, and transmit, to the second terminal, a sidelink data on the PSSCH based on the SCI, wherein a size of a bit field for the time resource assignment information is identified based on the maximum number of the reserved PSSCH resources configured by the resource pool information, wherein a value of the bit field for the time resource assignment information is identified based on a number of the at least one slot for the PSSCH, wherein in case that the number of the at least one slot for the PSSCH is 1, the value is zero, wherein, in case that the number of the at least one slot for the PSSCH is 2, the value is from 1 to 31, and wherein, in case that the number of the at least one slot for the PSSCH is 3, two slot offsets are obtained from the value.

10. The first terminal of claim 9,
wherein the resource pool information is included in at least one of pre-configuration, system information, or a radio resource control (RRC) message, and
wherein the maximum number is configured to one of 2 or 3.

11. The first terminal of claim 10,
wherein, in case that the maximum number is configured to 2, the size of the bit field is identified as 5 bits, and
wherein, in case that the maximum number is configured to 3, the size of the bit field is identified as 9 bits.

12. The first terminal of claim 9,
wherein each of the two slot offsets is a time offset in units of slots with respect to a first slot in which the SCI is transmitted, and
wherein the value of the bit field including the time resource assignment information is a time resource indicator value (TRIV).

13. A second terminal in a wireless communication system, the second terminal comprising:
a transceiver configured to transmit and receive a signal; and
a controller coupled with the transceiver and configured to:
receive, from a first terminal, sidelink control information (SCI) scheduling a physical sidelink shared channel (PSSCH) based on resource pool information for a sidelink communication, the SCI including time resource assignment information associated with a slot offset indication of at least one slot for the PSSCH, and
receive, from the second terminal, a sidelink data on the PSSCH based on the SCI,
wherein the resource pool information configures a maximum number of reserved PSSCH resources, and
wherein a size of a bit field for the time resource assignment information is identified based on the maximum number of the reserved PSSCH resources configured by the resource pool information,
wherein a value of the bit field for the time resource assignment information is identified based on a number of the at least one slot for the PSSCH,
wherein in case that the number of the at least one slot for the PSSCH is 1, the value is zero,
wherein, in case that the number of the at least one slot for the PSSCH is 2, the value is from 1 to 31, and
wherein, in case that the number of the at least one slot for the PSSCH is 3, two slot offsets are obtained from the value.

14. The second terminal of claim 13,
wherein the resource pool information is included in at least one of pre-configuration, system information, or a radio resource control (RRC) message, and
wherein the maximum number is configured to one of 2 or 3.

15. The second terminal of claim 14,
wherein, in case that the maximum number is configured to 2, the size of the bit field is identified as 5 bits, and
wherein, in case that the maximum number is configured to 3, the size of the bit field is identified as 9 bits.

16. The second terminal of claim 13,
wherein each of the two slot offsets is a time offset in units of slots with respect to a first slot in which the SCI is received, and
wherein the value of the bit field including the time resource assignment information is a time resource indicator value (TRIV).

* * * * *